United States Patent
Maeda et al.

(10) Patent No.: US 6,546,052 B1
(45) Date of Patent: Apr. 8, 2003

(54) IMAGE PROCESSING APPARATUS AND METHOD, AND COMPUTER-READABLE MEMORY

(75) Inventors: Mitsuru Maeda, Yokohama (JP); Hirochika Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/320,663

(22) Filed: May 27, 1999

(30) Foreign Application Priority Data

May 29, 1998 (JP) .......................... 10-149493
Dec. 28, 1998 (JP) .......................... 10-372241

(51) Int. Cl.⁷ .......................... H04B 1/66; G06K 9/36; H04N 7/12
(52) U.S. Cl. .......................... 375/240.08; 375/240.24; 382/243; 348/397.1
(58) Field of Search .......................... 375/240.08, 240.09, 375/240.1, 240.24; 382/243, 164, 165, 242, 169, 197; 348/397.1, 399.1, 236, 396.1, 699, 413.1; 358/462

(56) References Cited

U.S. PATENT DOCUMENTS

| | | | | |
|---|---|---|---|---|
| 4,951,140 A | * | 8/1990 | Ueno et al. | 348/413.1 |
| 5,057,940 A | * | 10/1991 | Murakami et al. | 358/462 |
| 5,701,367 A | * | 12/1997 | Koshi et al. | 375/240.1 |
| 5,745,607 A | | 4/1998 | Maeda | 382/240 |
| 5,898,799 A | * | 4/1999 | Murayama | 382/197 |
| 5,973,741 A | * | 10/1999 | Takashima et al. | 348/699 |
| 5,978,030 A | * | 11/1999 | Jung et al. | 348/699 |
| 6,072,903 A | * | 6/2000 | Maki et al. | 348/169 |

* cited by examiner

Primary Examiner—Gims S. Philippe
(74) Attorney, Agent, or Firm—Fitzpatrick, Cella, Harper & Scinto

(57) ABSTRACT

A first feature is extracted from first encoded data of a first image. A second feature is extracted from second encoded data of a second image. A first reconstructed image is obtained by decoding the first encoded data. A second reconstructed image is obtained by decoding the second encoded data. The first or second reconstructed image is corrected based on the first and second features. The first and second reconstructed images are synthesized.

60 Claims, 28 Drawing Sheets

F I G. 19
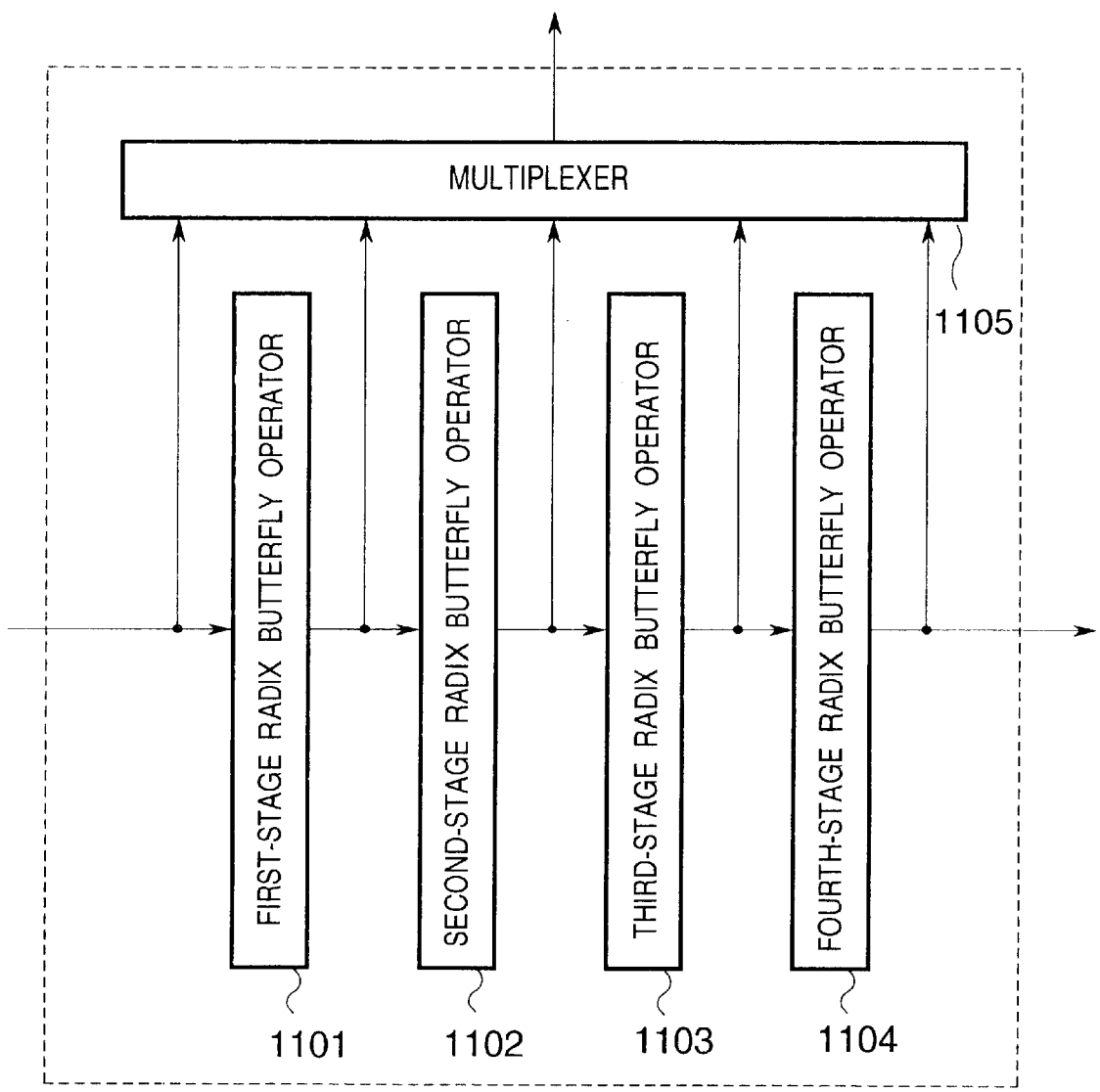

IMAGE PROCESSING APPARATUS AND METHOD, AND COMPUTER-READABLE MEMORY

BACKGROUND OF THE INVENTION

The present invention relates to an image processing apparatus and method for synthesizing a plurality of images, and a computer-readable memory.

As conventional moving image encoding schemes, h.261, MPEG-1, MPEG-2, and the like are known. These encoding schemes are internationally standardized by ITU and ISO, and their documents are available as h.261 recommendations and ISO11172 and ISO13818. Also, Motion JPEG encoding that encodes a moving image by applying still image encoding (e.g., JPEG encoding) to the respective frames is known.

An encoding system that encodes a moving image based on a video signal by MPEG-1 will be explained below with reference to FIG. 27.

FIG. 27 shows the arrangement of a conventional encoding system.

A TV camera 1001 inputs a video signal to an input terminal 1003 of a moving image encoding apparatus 1002, and that video signal is output to an A/D converter 1004. The video signal converted into a digital signal by the A/D converter 1004 is input to a block former 1005 to form a macroblock constructed by 16×16 pixels in the order from the upper left corner to the lower right corner of an image based on the video signal. An MPEG-1 stream includes I-frame for intra-frame encoding, P-frame for inter-frame encoding using past frames, and B-frame for inter-frame encoding using past and future frames. A frame mode unit 1017 determines the modes of these frames. The frame mode is determined in consideration of the bit rate of encoding, prevention of deterioration of image quality due to accumulated DCT computation errors, editing of an image, and scene changes.

In I-frame, a motion compensator 1006 is inoperative, and outputs zero. A subtractor 1007 subtracts the output from the motion compensator 1006 from the output from the block former 1005, and inputs the difference to a DCT transformer 1008. The DCT transformer 1008 DCT-transforms the input signal in units of 8×8 blocks, and the DCT-transformed signal is quantized by a quantizer 1009. The quantized signal is converted into a linear sequence by an encoder 1010, and codes are determined based on the zero-runlength and value of the signal. The encoded signal is output from a terminal 1011, and is recorded on a storage medium or is transmitted via a network, line, or the like. The output from the quantizer 1009 is dequantized by a dequantizer 1012, is inversely DCT-transformed by an inverse DCT transformer 1013, and is then added to the output from the motion compensator 1006 by an adder 1014. The sum signal is stored in a frame memory 1015 or 1016.

In P-frame, the motion compensator 1006 is operative, and the output from the block former 1005 is input to the motion compensator 1006, which performs motion compensation on the basis of the contents of the frame memory 1015 or 1016 which stores an image of an immediately preceding frame, and outputs a motion vector and predicted macroblocks. The subtractor 1007 calculates the difference between the input from the block former 1005 and the predicted macroblocks, and inputs the difference to the DCT transformer 1008. The DCT transformer 1008 DCT-transforms the input signal, and the DCT-transformed signal is quantized by the quantizer 1009. A code of the quantized signal is determined by the encoder 1010 on the basis of the motion vector, and is output from the terminal 1011. The output from the quantizer 1009 is dequantized by the dequantizer 1012, is inversely DCT-transformed by the inverse DCT transformer 1013, and is then added to the output from the motion compensator 1006 by the adder 1014. The sum signal is stored in the frame memory 1015 or 1016.

In B-frame, motion compensation is done as in P-frame. In this case, the motion compensator 1006 executes motion compensation based on the contents of both the frame memories 1015 and 1016 to generate predicted macroblocks, thus encoding a signal.

However, in the conventional method of encoding the entire image, a motionless image such as a background portion or the like must be repetitively transmitted, and the code length is wasted. For example, an object which is actually moving in a videophone, video meeting, or the like is only a person, and the background does not move. In I-frame which is sent at a given time interval, the motionless background image is also sent, thus wasting codes. FIG. 28 shows that example.

FIG. 28 shows a frame in which a person faces a television camera in a room. A person 1051 and background 1050 undergo identical encoding in a single frame. Since the background 1050 is motionless, nearly no codes are generated if motion compensation is done, but the background 1050 is encoded upon sending I-frame. For this reason, codes are repetitively and wastefully sent even for a motionless portion. In I-frame after the person 1051 has taken a large motion and a large code length has been generated upon encoding, a sufficiently large code length cannot be obtained. For this reason, in I-frame, coarse quantization coefficients must be set, and the image quality of even the motionless background deteriorates.

Hence, like MPEG-4, the background and object may be separately encoded to improve the encoding efficiency. In this case, since an object image sensed at another place can be synthesized, a frame may be formed by synthesizing another person 1052 to the frame shown in FIG. 28, as shown in FIG. 29.

However, the synthesized image (portion 1052) looks still unnatural due to color cast arising from the characteristics of an image sensing device, and the observer may find it incongruent. For example, when the image of the person 1052 is captured by a device that shows a green cast tendency, while the image of the person 1051 is captured by a device that shows a red cast tendency, color cast is conspicuous in an image obtained by synthesizing these two images, resulting in a very unnatural image.

Also, an image obtained by synthesizing images sensed with different contrasts caused by environmental differences such as illumination conditions and characteristics of image sensing devices looks unnatural, and the observer may find it incongruent. For example, when the image of the person 1052 is sensed under sunlight, while the image of the person 1051 is sensed under artificial light, the two images have a very large contrast difference, resulting in a very unnatural image.

SUMMARY OF THE INVENTION

The present invention has been made in consideration of the aforementioned problems, and has as its object to provide an image processing apparatus and method, which can easily synthesize a plurality of images and can generate a synthesized image with high image quality, and a computer-readable memory.

In order to achieve the above object, an image processing apparatus according to the present invention comprises the following arrangement.

That is, an image processing apparatus comprises:

first feature extraction means for extracting a first feature from first encoded data of a first image;

second feature extraction means for extracting a second feature from second encoded data of a second image;

first decoding means for obtaining a first reconstructed image by decoding the first encoded data;

second decoding means for obtaining a second reconstructed image by decoding the second encoded data;

correction means for correcting one of the first and second reconstructed images on the basis of the first and second features; and synthesis means for synthesizing the first and second reconstructed images.

In order to achieve the above object, an image processing method according to the present invention comprises the following arrangement.

That is, an image processing method comprises:

the first feature extraction step of extracting a first feature from first encoded data of a first image;

the second feature extraction step of extracting a second feature from second encoded data of a second image;

the first decoding step of obtaining a first reconstructed image by decoding the first encoded data;

the second decoding step of obtaining a second reconstructed image by decoding the second encoded data;

the correction step of correcting one of the first and second reconstructed images on the basis of the first and second features; and the synthesis step of synthesizing the first and second reconstructed images.

In order to achieve the above object, a computer-readable memory according to the present invention comprises the following arrangement.

That is, a computer-readable memory that stores program codes of image processing, has:

a program code of the first feature extraction step of extracting a first feature from first encoded data of a first image;

a program code of the second feature extraction step of extracting a second feature from second encoded data of a second image;

a program code of the first decoding step of obtaining a first reconstructed image by decoding the first encoded data;

a program code of the second decoding step of obtaining a second reconstructed image by decoding the second encoded data;

a program code of the correction step of correcting one of the first and second reconstructed images on the basis of the first and second features; and a program code of the synthesis step of synthesizing the first and second reconstructed images.

In order to achieve the above object, an image processing apparatus according to the present invention comprises the following arrangement.

That is, an image processing apparatus comprises:

supply means for supplying first and second encoded image data to be synthesized;

adjustment means for adjusting a density or color of at least one of the first and second encoded image data supplied by the supply means; and output means for outputting the first and second encoded image data adjusted by the adjustment means.

In order to achieve the above object, an image processing method according to the present invention comprises the following arrangement.

That is, an image processing method comprises:

the supply step of supplying first and second encoded image data to be synthesized;

the adjustment step of adjusting a density or color of at least one of the first and second encoded image data supplied in the supply step; and the output step of outputting the first and second encoded image data adjusted in the adjustment step.

In order to achieve the above object, a computer-readable memory according to the present invention comprises the following arrangement.

That is, a computer-readable memory that stores program codes of image processing, has:

a program code of the supply step of supplying first and second encoded image data to be synthesized;

a program code of the adjustment step of adjusting a density or color of at least one of the first and second encoded image data supplied in the supply step; and a program code of the output step of outputting the first and second encoded image data adjusted in the adjustment step.

In order to achieve the above object, an image processing apparatus according to the present invention comprises the following arrangement.

That is, an image processing apparatus for synthesizing a plurality of images, comprises:

background feature extraction means for extracting a background feature from encoded data of at least one background image;

object feature extraction means for extracting an object feature including statistic information of image information from encoded data of at least one object image;

background decoding means for generating a reconstructed background image by decoding the encoded data of the background image;

object decoding means for generating a reconstructed object image by decoding the encoded data of the object image;

correction means for correcting the reconstructed object image on the basis of the background and object features; and synthesis means for synthesizing the reconstructed background image and the reconstructed object image corrected by the correction means.

In order to achieve the above object, an image processing method according to the present invention comprises the following arrangement.

That is, an image processing method for synthesizing a plurality of images, comprises:

the background feature extraction step of extracting a background feature from encoded data of at least one background image;

the object feature extraction step of extracting an object feature including statistic information of image information from encoded data of at least one object image;

the background decoding step of generating a reconstructed background image by decoding the encoded data of the background image;

the object decoding step of generating a reconstructed object image by decoding the encoded data of the object image;

the correction step of correcting the reconstructed object image on the basis of the background and object features; and the synthesis step of synthesizing the reconstructed background image and the reconstructed object image corrected in the correction step.

In order to achieve the above object, a computer-readable memory according to the present invention comprises the following arrangement.

That is, a computer-readable memory that stores program codes of image processing for synthesizing a plurality of images, has:

a program code of the background feature extraction step of extracting a background feature from encoded data of at least one background image;

a program code of the object feature extraction step of extracting an object feature including statistic information of image information from encoded data of at least one object image;

a program code of the background decoding step of generating a reconstructed background image by decoding the encoded data of the background image;

a program code of the object decoding step of generating a reconstructed object image by decoding the encoded data of the object image;

a program code of the correction step of correcting the reconstructed object image on the basis of the background and object features; and a program code of the synthesis step of synthesizing the reconstructed background image and the reconstructed object image corrected in the correction step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a block diagram showing the detailed arrangement of a fast inverse DCT transformer in the fourth embodiment of the present invention;

DESCRIPTION OF THE PREFERRED EMBODIMENTS

The preferred embodiments of the present invention will be described in detail hereinafter with reference to the accompanying drawings.

First Embodiment

Figure 1:
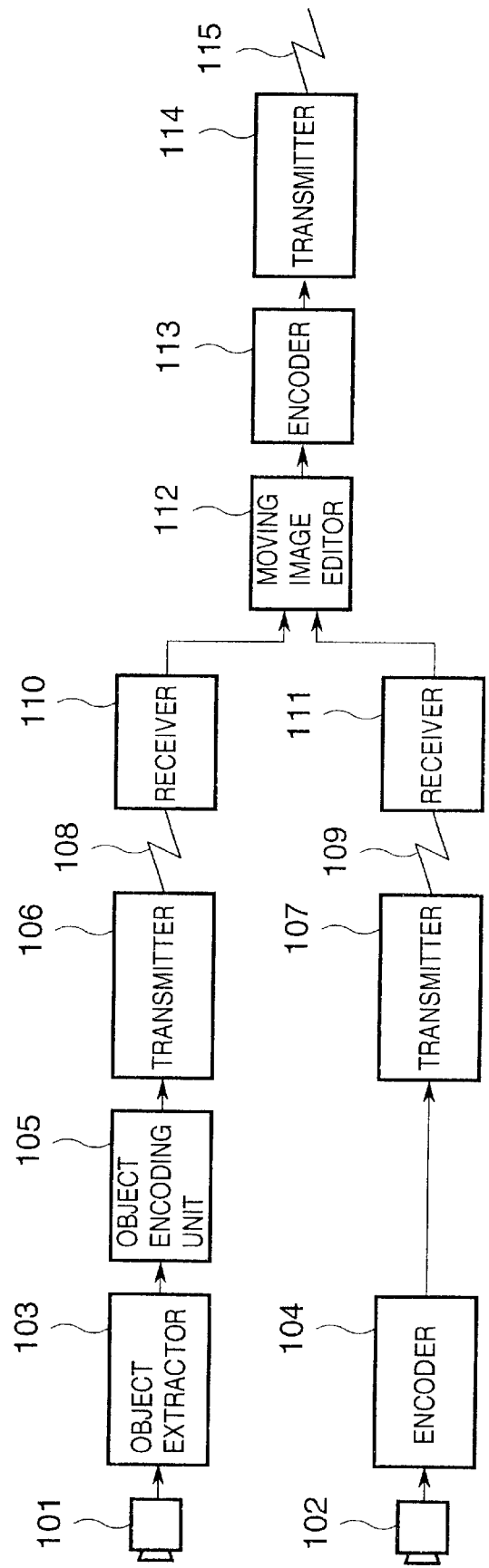
FIG. 1 is a block diagram showing the arrangement of a moving image transmission system according to the first embodiment of the present invention.

FIG. 1 is a block diagram showing the arrangement of a moving image transmission system according to the first embodiment of the present invention.

The first embodiment will exemplify a case wherein encoded images to be transmitted, which are obtained by encoding images sensed at a plurality of locations with different image sensing environments, and encoded data pre-stored in a storage medium such as a database or the like are decoded and synthesized by a host that manages the database, and the synthesized image data are transmitted to another terminal or a network.

Figure 29:
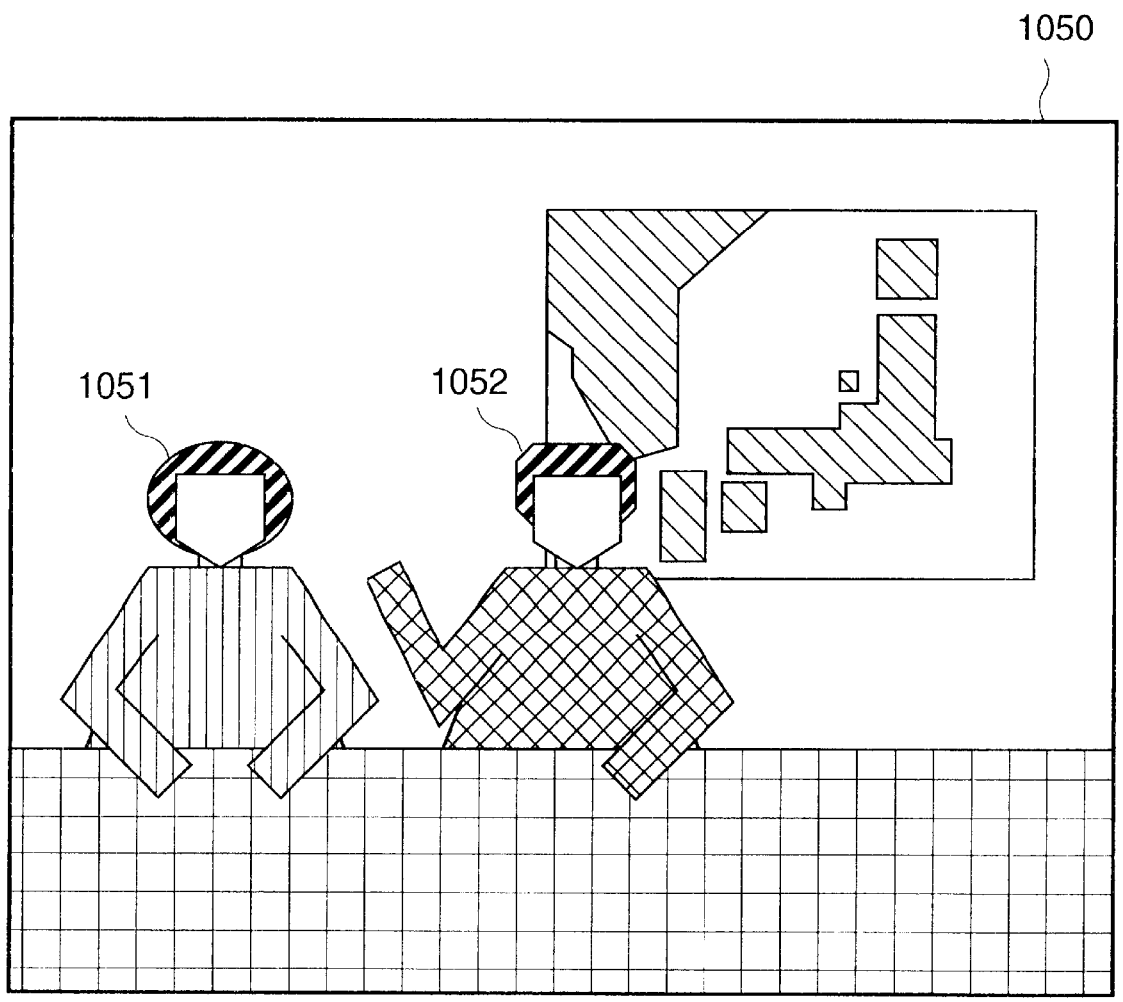
FIG. 29 shows an example of an image according to the present invention.

Referring to FIG. 1, a reference numeral 101 denotes a TV camera which senses a moving image in front of a blue background (blue back). The TV camera 101 is not particularly limited as long as it is a moving image input means such as a TV camera, other storage media, and the like. Assume that the TV camera 101 is sensing an image of a person 1052 shown in FIG. 29. Reference numeral 102 denotes a TV camera for sensing a moving image. The TV camera 102 need only be a moving image input means. Reference numeral 103 denotes an object extractor for extracting the image of the person 1052 as an object image from the blue back. Reference numeral 105 denotes an object encoding unit for encoding the extracted object image. In this embodiment, encoding is done by MPEG-4.

Reference numeral 104 denotes an encoder for encoding a moving image sensed by the TV camera 102. The encoding scheme is not particularly limited, and MPEG-1 encoding will be exemplified in this embodiment. Reference numerals 106 and 107 denote transmitters for transmitting encoded data. Reference numerals 108 and 109 denote communication lines. Reference numerals 110 and 111 denote receivers for receiving encoded data. Reference numeral 112 denotes a moving image editor according to the present invention. Reference numeral 113 denotes an encoder for encoding the edit result of the moving image editor 112. In this embodiment, MPEG-1 encoding will be exemplified. Note that the encoding scheme used in the encoder 113 is not limited to such specific scheme, and any other encoding schemes such as MPEG-4, MPEG-2, h.263, and the like may be used as long as a moving image can be encoded. Reference numeral 114 denotes a transmitter for transmitting data encoded by the encoder 113. Reference numeral 115 denotes a communication network such as a public network, broadcast radio wave, or the like.

Figure 2:
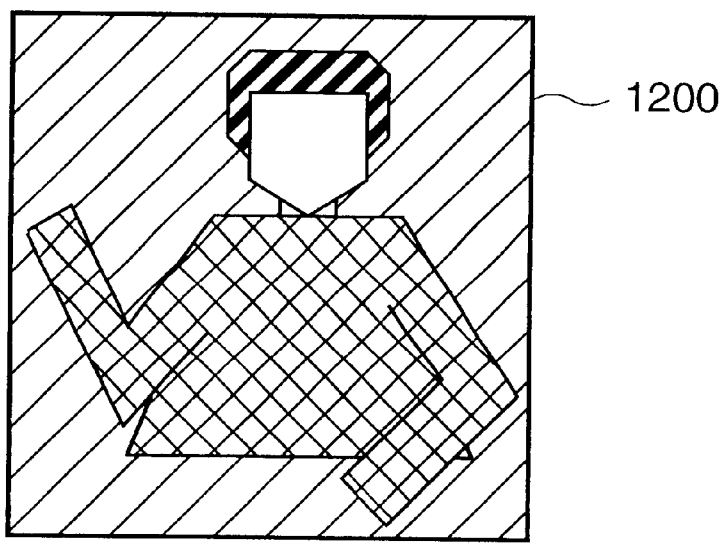
FIG. 2 shows an example of the texture of an object image in the first embodiment of the present invention.
Figure 3:
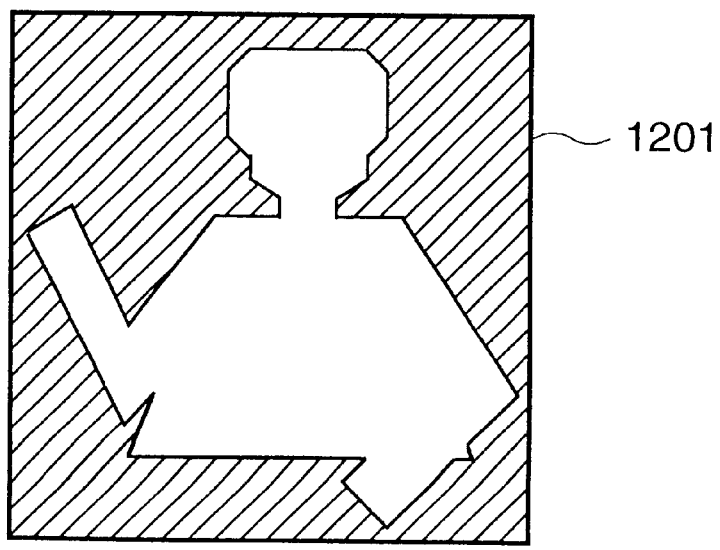
FIG. 3 shows an example of mask information in the first embodiment of the present invention.
Figure 4:
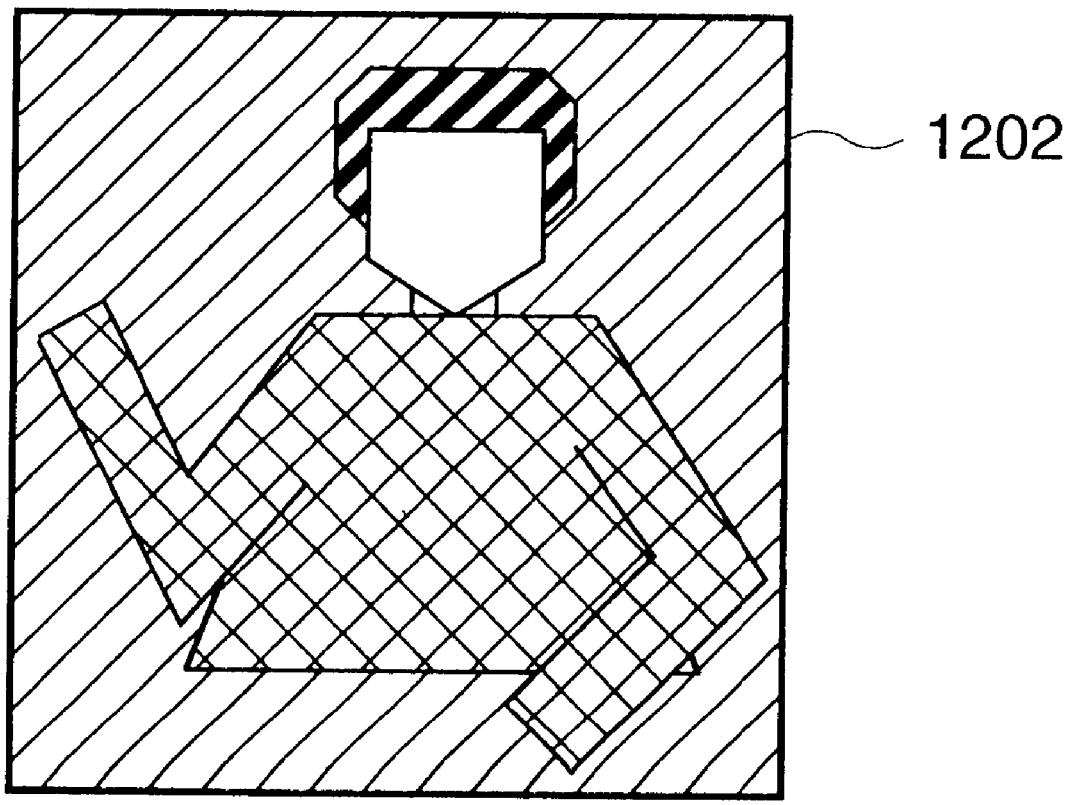
FIG. 4 shows an example of an encoded image in the first embodiment of the present invention.

In this arrangement, the TV camera 101 senses an image of the person 1052 as the object to be sensed with a blue back as a background. The object extractor 103 extracts the image of the person 1052 as an object image from an input moving image. FIGS. 2 to 4 show this state.

Referring to FIG. 2, the image of the person 1052 as the object to be sensed is extracted as a rectangular texture 1220. Subsequently, a blue-back portion is extracted to generate mask information 1201 shown in FIG. 3. Image data of the texture 1200, and the mask information 1201 are input to the object encoding unit 105. FIG. 4 shows an image obtained by the processing of the object encoding unit 105, which will be described in detail below.

The detailed arrangement of the object encoding unit 105 in the first embodiment will be described with reference to FIG. 5.

Figure 5:
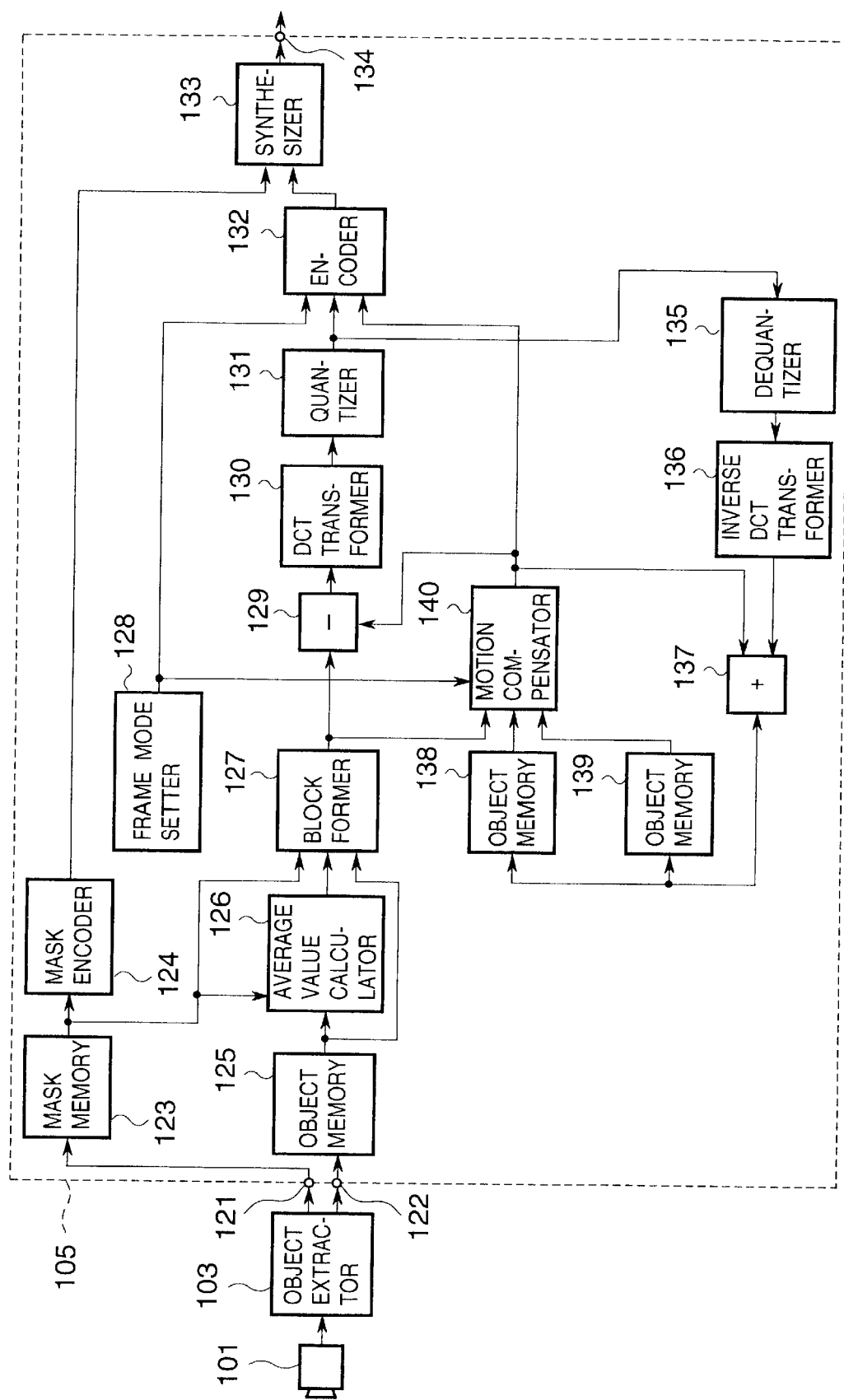
FIG. 5 is a block diagram showing the detailed arrangement of an object encoding unit in the first embodiment of the present invention.

FIG. 5 is a block diagram showing the detailed arrangement of the object encoding unit in the first embodiment of the present invention.

Reference numerals 121 and 122 denote terminals. The terminal 122 receives image data of the texture 1200 of the image to be encoded and the terminal 121 receives the mask information 1201 from the object extractor 103 shown in FIG. 1. Reference numeral 123 denotes a mask memory for storing the mask information 1201. Reference numeral 124 denotes a mask encoder for encoding the mask information 1201. Reference numeral 125 denotes an object memory for storing the image data of the texture 1200. Reference numeral 126 denotes an average value calculator for calculating the average value of pixel values of the object image. Reference numeral 127 denotes a block former for segmenting the object image into encoding unit blocks. Reference numeral 128 denotes a frame mode setter for selecting a frame encoding mode from I-, P-, and B-frame modes in accordance with a predetermined cycle.

Reference numeral 129 denotes a subtractor. Reference numeral 130 denotes a DCT transformer for performing DCT (Discrete Cosine Transform) transformation. Reference numeral 131 denotes a quantizer for quantizing the output from the DCT transformer 130. Reference numeral 132 denotes an encoder for converting the quantization result into a linear sequence, and assigning codes to a zero-runlength and value, thereby encoding the quantization result. Reference numeral 133 denotes a synthesizer for synthesizing encoded data generated by the mask encoder 124 and encoder 132. Reference numeral 134 denotes a terminal for finally outputting generated encoded data. Reference numeral 135 denotes a dequantizer for performing dequantization. Reference numeral 136 denotes a inverse DCT transfer for performing inverse DCT transformation. Reference numeral 137 denotes an adder. Reference numerals 138 and 139 denote object memories for storing reconstructed image data. Reference numeral 140 denotes a motion compensator for performing motion compensation on the basis of the input from the block former 127 and the contents of the object memories 138 and 139.

In the above arrangement, the respective memories are cleared and the respective building elements are reset at the beginning of encoding. The frame mode setter 128 instructs I-frame upon encoding the first frame. At this time, the motion compensator 140 is inoperative, and outputs zero as a motion compensation prediction value. The image data of the texture 1200 and mask information 1201 are synchronously loaded from the terminals 122 and 121, and are respectively stored in the object memory 125 and the mask memory 123.

Upon completion of storage of data for one frame, the mask encoder 124 encodes the mask information 1201, and outputs encoded data to the synthesizer 133. The average value calculator 126 checks based on the mask information 1201 if each input pixel is that of a background or object image, and calculates an average value m of the image of the person 1052 as the object image. The block former 127 synchronously loads the image data of the texture 1200 and mask information 1201 in units of blocks, and it replaces an input pixel by the average value m if the mask information 1201 of that pixel indicates a background pixel; otherwise, it directly outputs the input pixel value, thus forming a block constructed by 8×8 pixels. More specifically, on the entire image, the background portion is replaced by the average value m, as shown in FIG. 4. Since the motion compensation prediction value is zero, the subtractor 129 directly outputs the input. This output is DCT-transformed by the DCT transformer 130, and its coefficient is quantized by the quantizer 131. The quantization result is assigned a code by the encoder 132, and that code is output to the synthesizer 133. The synthesizer 133 appends a required header to the encoded data generated by the mask encoder 124 and encoder 132, arranges the data, and outputs the data from the terminal 134. On the other hand, the quantization result is dequantized by the dequantizer 135, and a reconstructed pixel value is obtained by the inverse DCT transformer 136. The reconstructed pixel value is stored in one of the object memories 138 or 139 via the adder 137.

When the frame mode setter 128 instructs P- or B-frame, the motion compensator 140 is operative, reads out image data required for motion compensation from the object memories 138 and 139, and checks if motion compensation is to proceed. If motion compensation is to proceed, the motion compensator 140 outputs the motion compensation prediction value to the subtractor 129 and adder 137, and inputs a motion vector used in motion compensation to the encoder 132. If motion compensation is canceled, zero motion compensation prediction value is output.

In this way, encoded data encoded by the object encoding unit 105 is output onto the communication line 108 via the transmitter 106.

Figure 27:
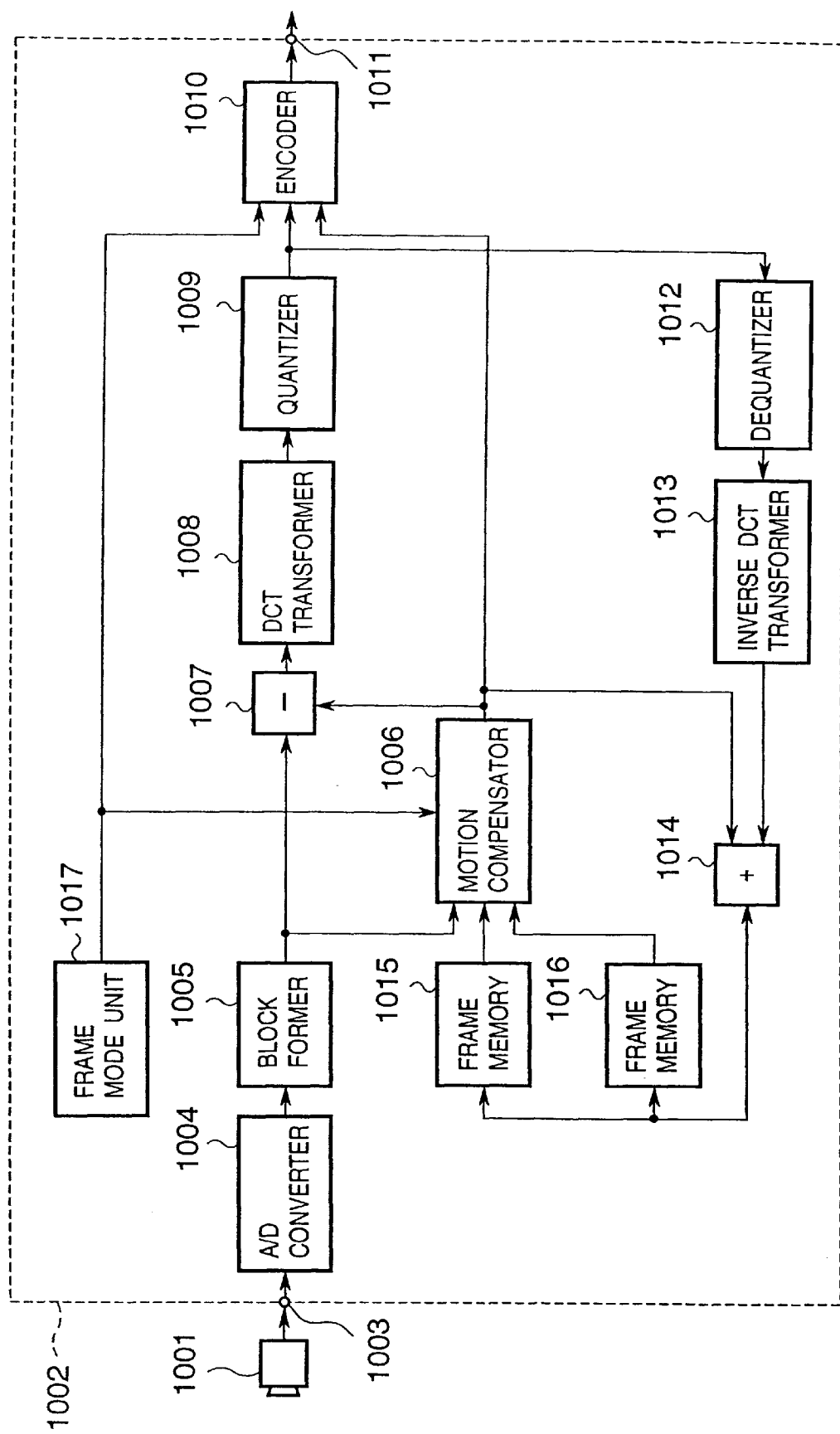
FIG. 27 is a block diagram showing the arrangement of a conventional encoding system.

On the other hand, an image sensed by the TV camera 102 is encoded by MPEG-1 by the same arrangement as the moving image encoding apparatus 1002 shown in FIG. 27, and is output onto the communication line 109 via the transmitter 107.

The receivers 110 and 111 receive the encoded data via the communication lines 108 and 109, and transmit them to the moving image editor 112.

The detailed arrangement of the moving image editor 112 of the first embodiment will be explained below with the aid of FIG. 6.

Figure 6:
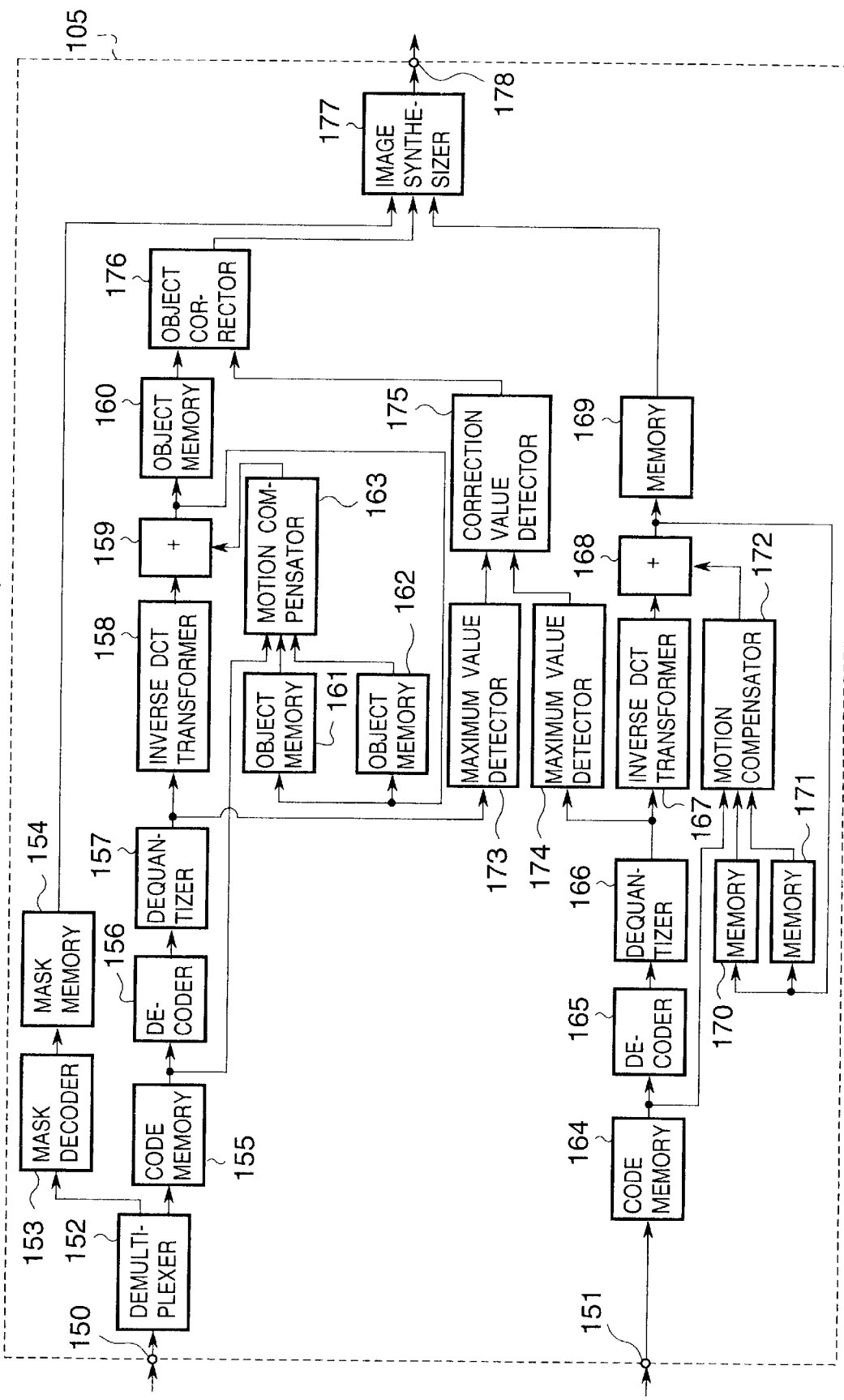
FIG. 6 is a block diagram showing the detailed arrangement of a moving image editor in the first embodiment of the present invention.

FIG. 6 is a block diagram showing the detailed arrangement of the moving image editor of the first embodiment.

Reference numerals 150 and 151 denote terminals. The terminal 150 receives encoded data from the receiver 110, and the terminal 151 receives encoded data from the receiver 111. Reference numeral 152 denotes a demultiplexer for demultiplexing encoded data of the mask information and that of the texture of the object image from the encoded data. Reference numeral 153 denotes a mask decoder for decoding the mask information. Reference numeral 154 denotes a mask memory for storing mask information. Reference numeral 155 denotes a code memory for storing encoded data of the texture of the object image.

Reference numeral 164 denotes a code memory for storing encoded data input from the receiver 111. Reference numeral 156 denotes a decoder for decoding encoded data of the texture of the object image. Reference numeral 165 denotes a decoder for decoding encoded data input from the receiver 111. Reference numerals 157 and 166 denote dequantizers. Reference numerals 158 and 167 denote inverse DCT transformers. Reference numerals 159 and 168 denote adders. Reference numerals 160, 161, and 162 denote object memories for storing reconstructed image data of the textures of the object images. Reference numerals 169, 170, and 171 denote memories for storing image data obtained by reconstructing a moving image sensed by the TV camera 102. Reference numerals 163 and 172 denote motion compensators.

Reference numerals 173 and 174 denote maximum value detectors for detecting the maximum values of input image data values. Reference numeral 175 denotes a correction value calculator for calculating a correction value on the basis of the two input maximum values. Reference numeral 176 denotes an object corrector for correcting image data of the texture of the object image by the correction value. Reference numeral 177 denotes an image synthesizer for synthesizing images. Reference numeral 178 denotes a terminal for outputting the synthesized image to the encoder 113.

Note that the maximum value detectors 173 and 174 detect maximum values per frame, in units of a plurality of frames, or in units of object images.

In the above arrangement, the terminals 150 and 151 respectively receive encoded data from the receivers 110 and 111. The demultiplexer 152 demultiplexes encoded data of the mask information and that of the texture of the object image from the input encoded data, and respectively inputs these encoded data to the mask decoder 153 and code memory 155. The mask decoder 153 reclaims mask information by decoding the encoded data of the mask information, and stores it in the mask memory 154. The encoded data stored in the code memory 155 is decoded by the decoder 156 to reconstruct a quantized value. This value is dequantized by the dequantizer 157, and is inversely DCT-transformed by the inverse DCT transformer 158. In case of an I-frame macroblock, the motion compensator 163 is inoperative, and outputs zero. In case of a macroblock to be motion-compensated in P- or B-frame, the motion compensator 163 is operative and outputs a motion compensation prediction value.

The adder 159 adds the value obtained by inverse DCT transformation by the inverse DCT transformer 158, and the output from the motion compensator 163, and stores the sum in one of the object memories 160 and the object memory 161 or 162, and 162. On the other hand, of the output from the dequantizer 157, DC components that represent the average value of luminance information are input to the maximum detector 173, which finally obtains and outputs a maximum value MAXo of the input DC components.

At the same time, encoded data stored in the code memory 164 is decoded by the decoder 165 to recover a quantized value. This value is dequantized by the dequantizer 166, and is inversely DCT-transformed by the inverse DCT transformer 167. Initially, since an I-frame macroblock is input, the motion compensator 172 is inoperative and outputs zero. The adder 168 stores the value obtained by inverse DCT transformation by the inverse DCT transformer 167 in one of the memories 169 and the object memory 170 or 171.

On the other hand, of the output from the dequantizer 166, DC components that represent the average value of luminance information are input to the maximum detector 174, which finally obtains and outputs a maximum value MAXb of the input DC components.

After image data are stored in the object memory 160 and memory 169 upon completion of decoding for one frame, the maximum value detectors 173 and 174 input the maximum values of the input luminance component DC components to the correction value calculator 175. The correction value calculator 175 calculates a ratio r between the maximum values MAXo and MAXb by:

$$r = MAXo/MAXb \qquad (1)$$

After that, pixel values are read out from the memory 169 in the pixel order of a scan line, and are input to the image synthesizer 177. When the synthesis position of the object image has been reached, the mask information and image data are read out from the mask memory 154 and object memory 160, and are corrected by the object corrector 176, thus inputting the corrected data to the image synthesizer 177. The object corrector 176 corrects an input pixel value p by the ratio r to obtain and output a corrected pixel value P by:

$$P = p \times r \qquad (1)$$

Figure 7:
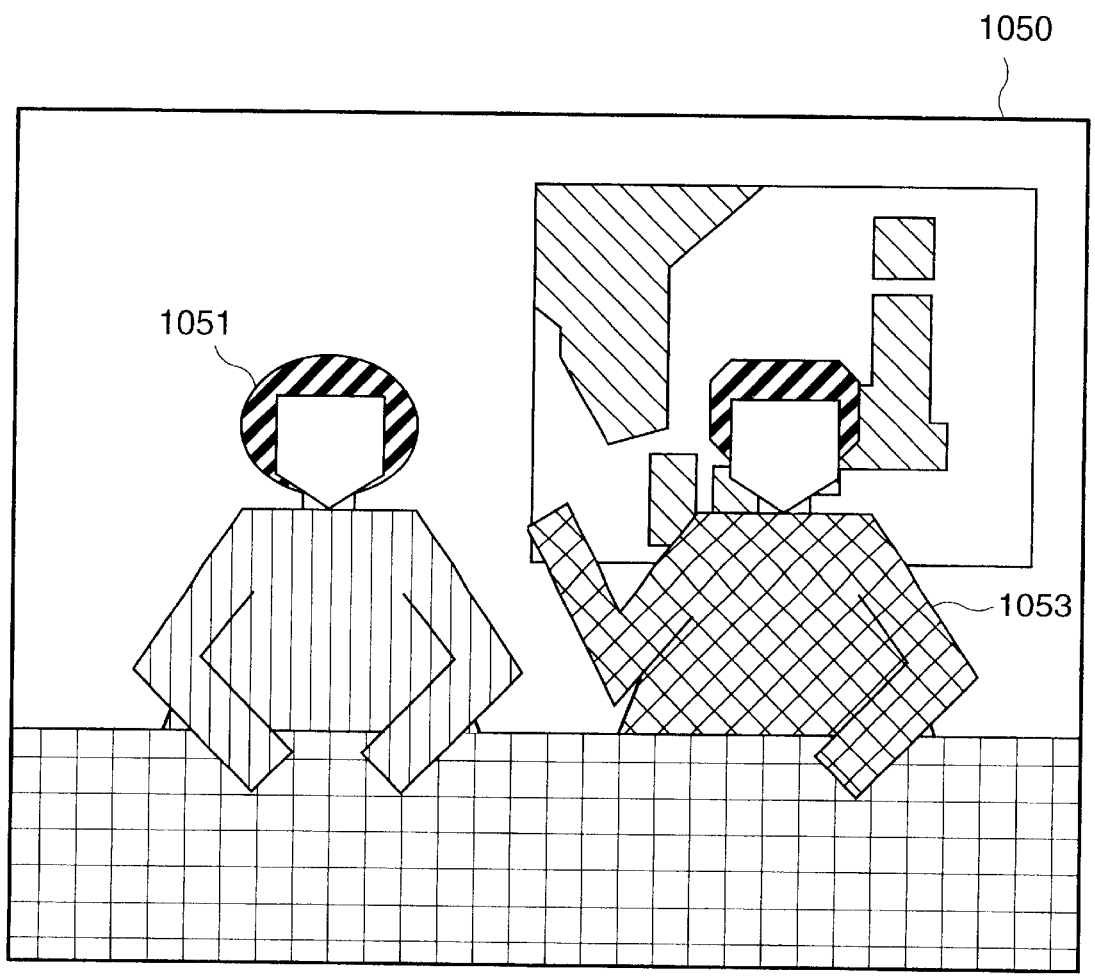
FIG. 7 shows an example of the synthesis result of an object image according to the first embodiment of the present invention.

When the mask information is indicative of the object image, the image synthesizer 177 outputs a pixel value from the object corrector 176; otherwise, it outputs a pixel value from the object memory 169, thereby synthesizing images, and outputting the synthesized image to the encoder 113 via the terminal 178. FIG. 7 shows the synthesized result of an image of a person 1053 as an image obtained by correcting the image of the person 1052. The encoder 113 encodes the output image by MPEG-1, and outputs encoded data onto the communication network 115 via the transmitter 114.

With a series of operations mentioned above, an image including a background image and an object image, is separated into the background image and the object image, upon synthesizing encoded data of these images, feature amounts of these image data are extracted, and the pixel values of the object image to be synthesized are corrected, thus achieving image synthesis immune to incongruity, and attaining high-speed processing since the average values in units of blocks are used in correction value calculations.

In the description of the first embodiment, MPEG-4 is used for encoding the object image, and MPEG-1 is used for encoding other images. However, the present invention is not limited to such specific schemes, and any other encoding schemes may be used as long as they have the same functions as those of these schemes.

Also, the luminance DC components are used as the feature amount of image data. However, the present invention is not limited to such specific feature amount. For example, an achromatic maximum value may be extracted using chromaticity.

Furthermore, the memory configuration is not limited to the above-mentioned one. For example, processing may be done using line memories and the like, or other configurations may be adopted.

Some or all of building elements may be implemented by software running on, e.g., a CPU.

Figure 8:
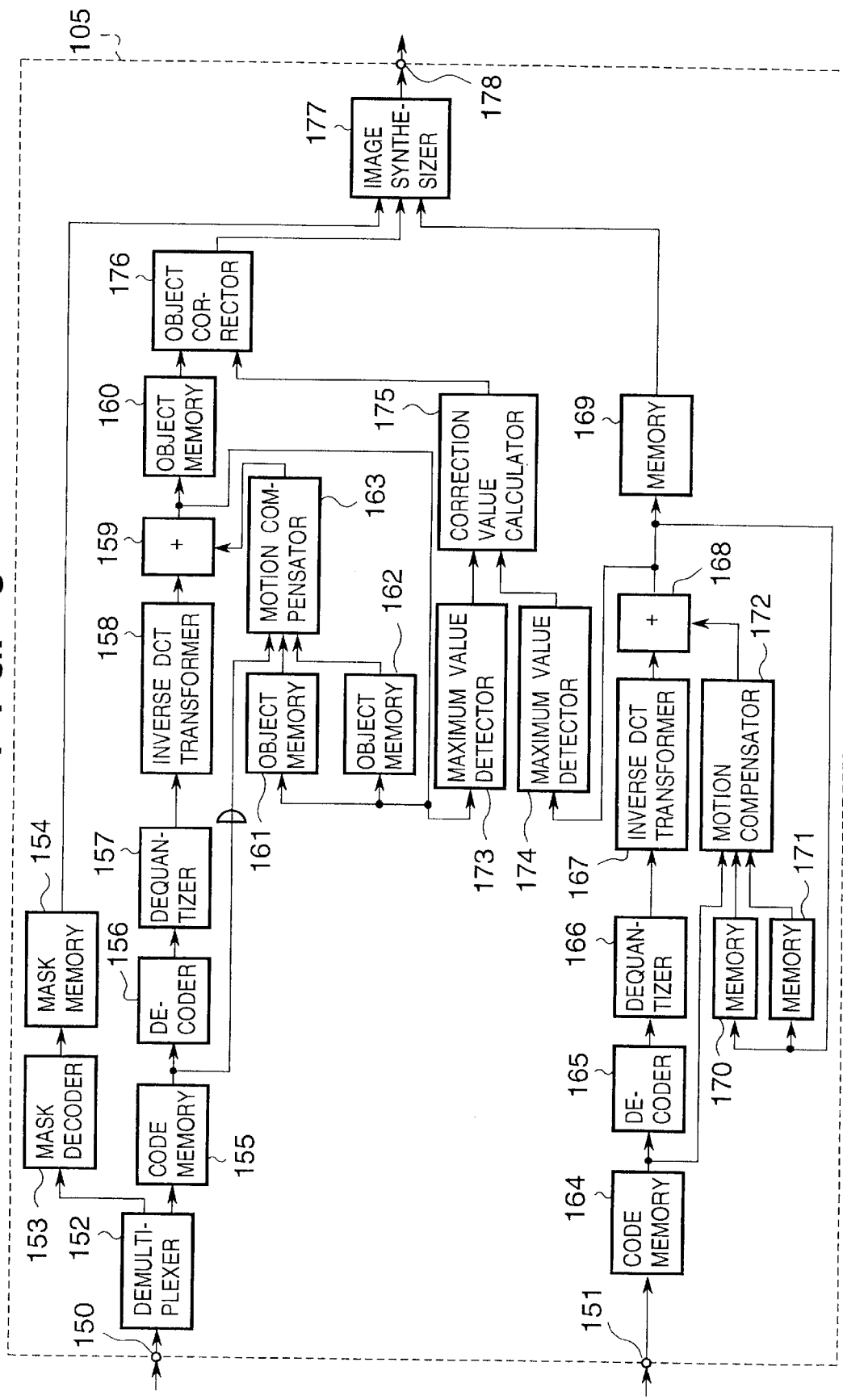
FIG. 8 is a block diagram showing another detailed arrangement of a moving image editor in the first embodiment of the present invention.

The feature amount of image data may be extracted in units of pixels in place of blocks. FIG. 8 is a block diagram showing the moving image editor 105 having a function of extracting the feature amount of image data in units of pixels. The respective building elements and operations of this apparatus 105 are substantially the same as those shown in FIG. 6, except that the outputs from the adders 159 and 168 are input to the maximum value detectors 173 and 174. With this arrangement, correction values can be calculated in units of pixels. In the first embodiment, the luminance values of images to be synthesized are adjusted. Alternatively, according to the present invention, color balance may be adjusted.

Second Embodiment

Figure 9:
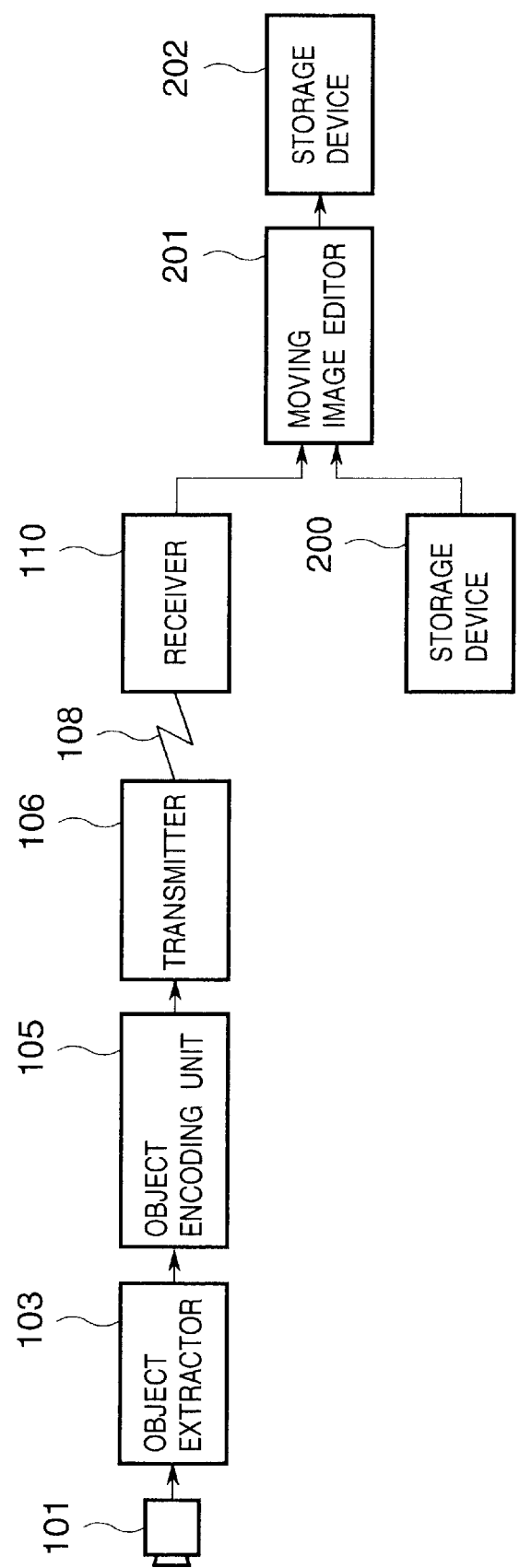
FIG. 9 is a block diagram showing the arrangement of a moving image transmission system according to the second embodiment of the present invention.

FIG. 9 is a block diagram showing the arrangement of a moving image transmission system according to the second embodiment of the present invention.

Note that the same reference numerals denote the same building elements as those in the first embodiment, and a detailed description thereof will be omitted.

Reference numeral 200 denotes a storage device for storing a sequence encoded by MPEG-4. The storage device 200 comprises, e.g., a CD-ROM, magnetic disk, tape storage device, or the like. Reference numeral 201 denotes a moving image editor of the second embodiment. Reference numeral 202 denotes a storage device for storing encoded data.

As in the first embodiment, in this arrangement, the TV camera 101 senses an image of the person 1052 as the object to be sensed with a blue back as a background. The object extractor 103 extracts a texture containing the image of the person 1052 an input moving image. Subsequently, a blue-back portion is extracted to generate mask information 1201. Image data of the texture 1200, and the mask information 1201 are input to the object encoding unit 105. These data are encoded by the object encoding unit 105 by MPEG-4, and the encoded data are output onto the communication line 108 via the transmitter 106. The receiver 110 receives the encoded data, and inputs the data to the moving image editor 201. In synchronism with this operation, a required sequence is read out from the storage device 200, and is input to the moving image editor 201.

The detailed arrangement of the moving image editor 201 of the second embodiment will be described below with the aid of FIG. 10.

Figure 10:
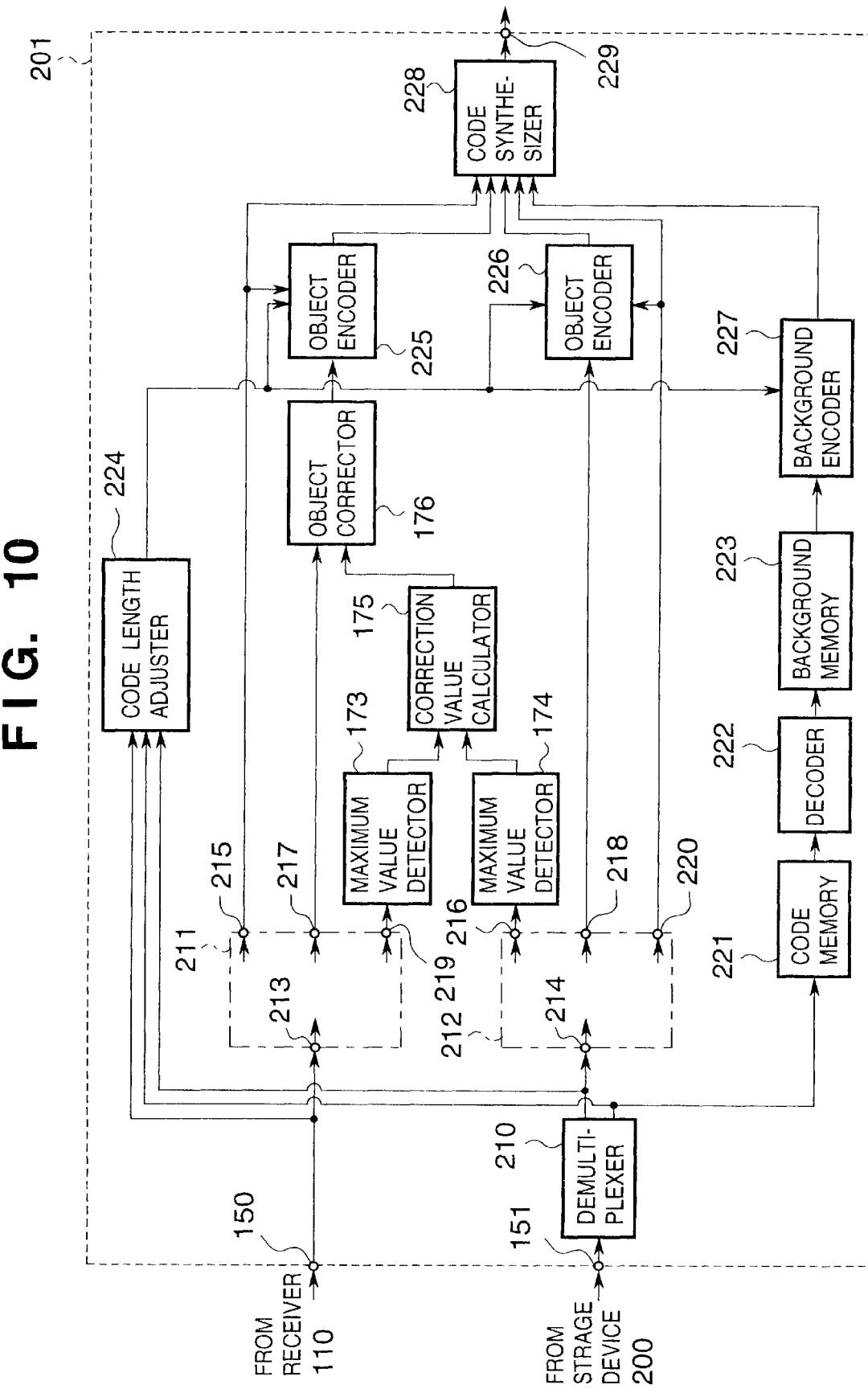
FIG. 10 is a block diagram showing the detailed arrangement of a moving image editor in the second embodiment of the present invention.

FIG. 10 is a block diagram showing the detailed arrangement of the moving image editor according to the second embodiment of the present invention.

Note that the same reference numerals denote the same building elements as those in the first embodiment, and a detailed description thereof will be omitted.

Figure 28:
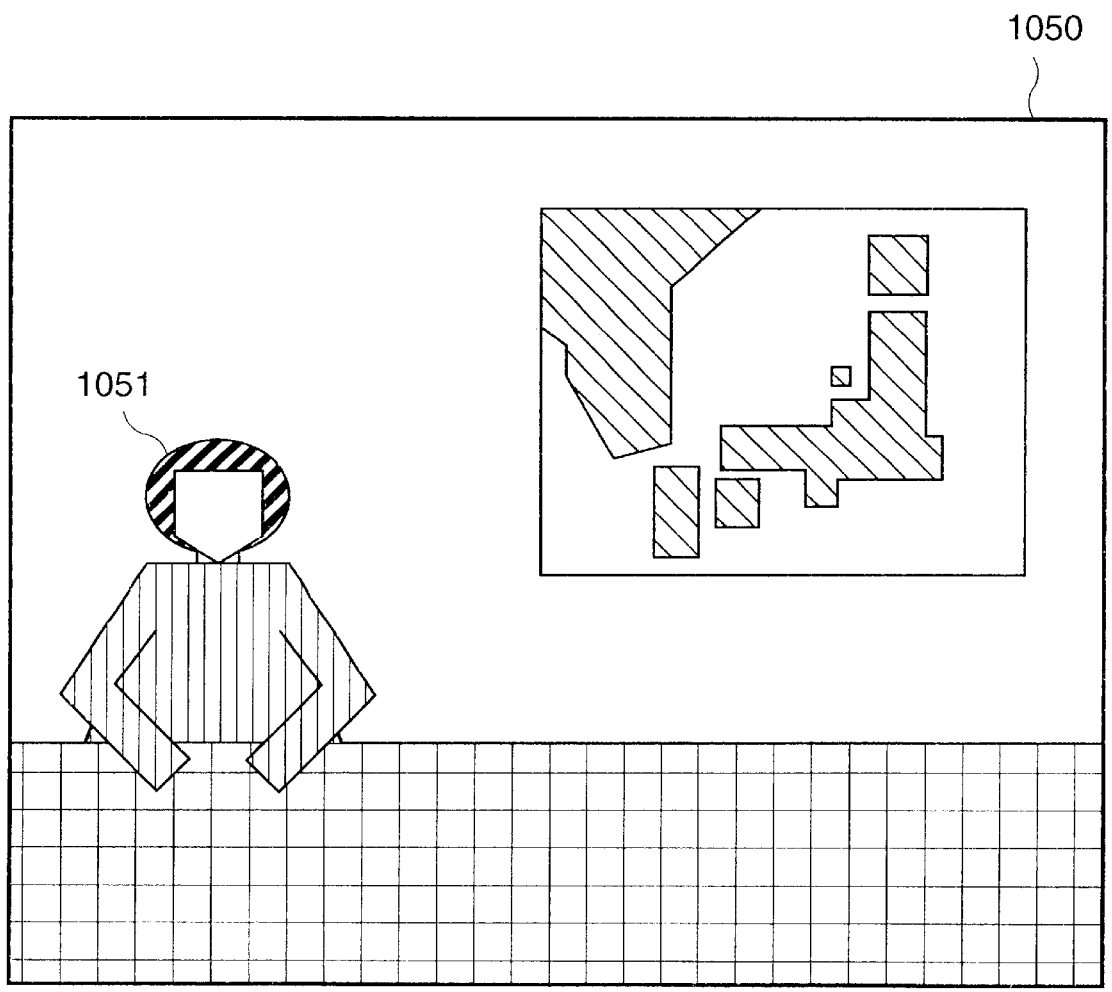
FIG. 28 shows an example of an image according to the present invention.

Reference numeral 210 denotes a demultiplexer for demultiplexing encoded data of the background image and encoded data of the object image (the image of the person 1051 in FIG. 28) contained therein from the input encoded data. Bold frames 211 and 212 indicate object decoding units for decoding data in units of MPEG-4 objects. These object decoders will be described in detail later. Reference numerals 213 and 214 denote terminals for receiving encoded data. Reference numerals 215 and 216 denote terminals for outputting decoded information. Reference numerals 217 and 218 denote terminals for outputting decoded DC components. Reference numerals 219 and 220 denote terminals for outputting pixel values obtained by decoding. Reference numeral 221 denotes a code memory for storing encoded data of the background image. Reference numeral 222 denotes a decoder for decoding that encoded data.

Reference numeral 223 denotes a background memory for storing the decoded background image. Reference numeral 224 denotes a code length adjuster for adjusting the code length upon generating new encoded data from the input encoded data. Reference numerals 225 and 226 denote object encoders for encoding object images by MPEG-4. Reference numeral 227 denotes a background encoder for encoding the background image by MPEG-4. Reference numeral 228 denotes a code synthesizer for appending headers to encoded data generated by the respective encoders, arranging the data, and so forth in accordance with the MPEG-4 format. Reference numeral 229 denotes a terminal for outputting generated encoded data to the storage device 202.

In this arrangement, the terminal 150 receives encoded data of the object image from the receiver 110. The encoded data of the object image is input to the object decoding unit 211. The encoded data of the object image will be referred to as first object encoded data hereinafter. At this time, the terminal 151 receives encoded data from the storage device 200. The encoded data input from the storage device 200 consists of those of both a background image and object image like the background 1050 and person 1051 in FIG. 28 according to the MPEG-4 format.

The demultiplexer 210 demultiplexes these encoded data. The encoded data of the background image is input to the code memory 221, and the encoded data of the object image is input to the object decoding unit 212. The encoded data of the object image will be referred to as second object encoded data. At the same time, the two object encoded data and the encoded data of the background image are input to the code length adjuster 224. The code length adjuster 224 determines assignment of a code length upon encoding in correspondence with the bit rate of the storage device 202. For the sake of simplicity, assume that the frame modes of the first and second object encoded data match each other. The code length adjuster 224 divides the bit rate of the storage device 202 by the ratio of the input code lengths, and sets the quotient as an upper limit of the code length upon encoding the corresponding encoded data. More specifically, let L1 be the code length of the first object encoded data, L2 be the code length of the second object encoded data, Lb be the code length of the encoded data of the background image, and M be the bit rate of the storage device 202. Also, let U1 be the upper limit of the code length upon newly encoding the first object encoded data, U2 be the upper limit of the code length upon newly encoding the second object encoded data, and Ub be the upper limit of the new code length of the background image. Then, these upper $$U1 = M \times L1/(L1+L2+Lb) \quad (3)$$

$$U2 = M \times L2/(L1+L2+Lb) \quad (4)$$

$$Ub = M \times Lb/(L1+L2+Lb) \quad (5)$$

The encoded data stored in the code memory 221 is decoded by the decoder 222, and is stored in the background memory 223. The contents of the background memory 223 are encoded by the background encoder 227 to have the upper limit Ub of its code length. Code length adjustment is implemented by adjusting quantization coefficients upon quantization. The encoded data of the object images input to the object decoding units 211 and 212 are decoded, thus outputting mask information, and the pixel values and DC components of the object images.

The detailed arrangement of the object decoding unit 211 of the second embodiment will be explained below with reference to FIG. 11.

Figure 11:
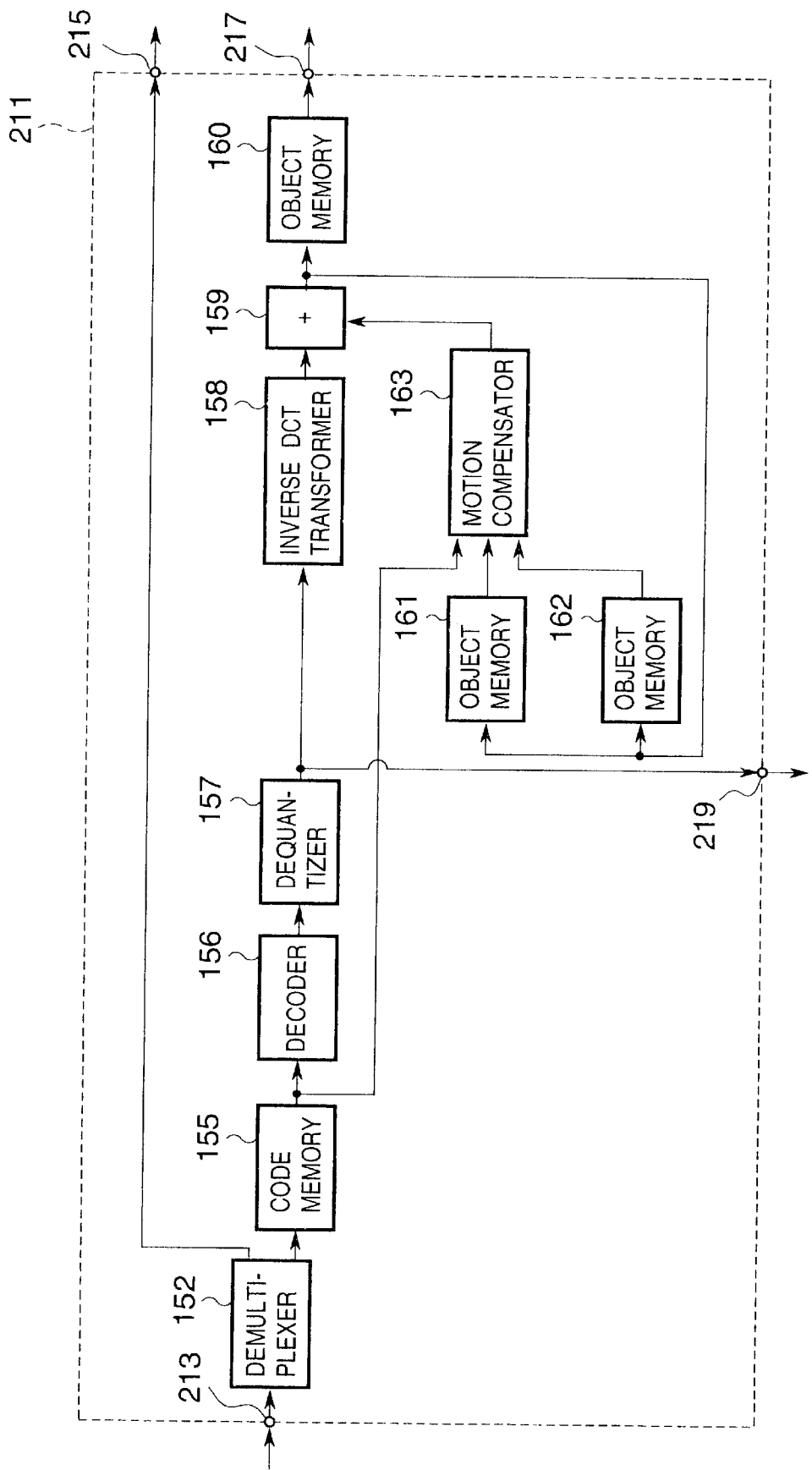
FIG. 11 is a block diagram showing the detailed arrangement of an object decoding unit in the second embodiment of the present invention.

FIG. 11 is a block diagram showing the detailed arrangement of the object decoding unit according to the second embodiment of the present invention.

Note that the object decoding unit 212 has the same structure as that of the unit 212. Also, the same reference numerals denote the same building elements as those in FIG. 6 in the first embodiment, and a detailed description thereof will be omitted.

The demultiplexer 152 demultiplexes encoded data of the mask information and that of the texture of the object image from the first object encoded data input from the terminal 213. The encoded data of the mask information is directly output from the terminal 215. The encoded data of the texture image is input to the code memory 155. The encoded data stored in the code memory 155 is decoded by the decoder 156 to reconstruct a quantized value.

This value is dequantized by the dequantizer 157, and is inversely DCT-transformed by the inverse DCT transformer 158. In case of an I-frame macroblock, the motion compensator 163 is inoperative, and outputs zero. In case of a macroblock to be motion-compensated in P- or B-frame, the motion compensator 163 is operative and outputs a motion compensation prediction value. The adder 159 adds the value obtained by inverse DCT, and the output from the motion compensator 163, and stores the sum in one of the object memories 160 and the object memory 161 or 162. The contents of the object memory 160 are output from the terminal 217. On the other hand, of the output from the dequantizer 157, the DC components of luminance information are input to the maximum detector 173 via the terminal 219.

After both the first and second object encoded data for one frame are decoded, the maximum value detectors 173 and 174 respectively obtain maximum values MAX1 and MAX2 of finally input DC components, and output them to the correction value calculator 175. The correction value calculator 175 calculates a ratio r between the maximum values MAX1 and MAX2 using equation (1) above.

After that, pixel values are read out from the object memory 160 in the object decoding unit 211 in the pixel order of a scan line, and are input to the object corrector 176. The object corrector 176 corrects an input pixel value p by the ratio r using equation (2) above to obtain a corrected pixel value P, and outputs it to the object encoder 225. The object encoder 225 counts a code length S1 of the encoded data of the mask information output from the terminal 215, and sets a value U1' obtained by subtracting S1 from the upper limit U1 of the code length as an upper limit of the code length of the image data. Quantization coefficients are adjusted to obtain the upper limit U1', thus obtaining encoded data with a code length equal to (or close to) U1'.

At the same time, the encoded data of mask information and pixel values are read out from the object memory in the object decoding unit 212 in the pixel order of a scan line, and are output to the object encoder 226. The object encoder 226 counts a code length S2 of the encoded data of the mask information output from the terminal 215, and sets a value U2' obtained by subtracting S2 from the upper limit U2 of the code length as an upper limit of the code length of the image data of the texture. Quantization coefficients are adjusted to obtain the upper limit U2', thus obtaining encoded data with the code length equal to (or close to) U2'.

The encoded data newly encoded by the object encoders 225 and 226, and background encoder 227, and the encoded data of the mask information output from the terminals 215 and 216 are input to the code synthesizer 228, which appends headers to those data, aligns the data, and so forth in accordance with the MPEG-4 format, and outputs the synthesized data to the storage device 203 via the terminal 229. The storage device 202 stores the encoded data at a predetermined location.

With a series of operations mentioned above, an image including a background image and an object image, is separated into the background image and the object image, upon synthesizing encoded data of these images, feature amounts of these image data are extracted, and the pixel values of the object image to be synthesized are corrected, thus achieving image synthesis immune to incongruity, and attaining high-speed processing since the average values in units of blocks are used in correction value calculations. Also, since correction is done between the objects, the processing volume can be greatly reduced. Furthermore, since the feature amounts of objects in similar light ray states in the background are used, sense of incongruity can be further alleviated.

In the second embodiment, one of the object images is input from the apparatus for transmitting encoded data. However, the present invention is not limited to such specific source. For example, a storage device similar to the storage device 200 may be used as long as it can output the encoded data of an object. Also, the output destination is not limited to a storage medium. For example, the obtained data may be output onto a communication network as in the first embodiment.

In the description of the second embodiment, MPEG-4 is used for encoding the object image, and MPEG-1 is used for encoding other images. However, the present invention is not limited to such specific schemes, and any other encoding schemes may be used as long as they have the same functions as those of these schemes.

Also, the luminance DC components are used as the feature amount of image data. However, the present invention is not limited to such specific feature amount. For example, an achromatic maximum value may be extracted using chromaticity.

Furthermore, the memory configuration is not limited to the above-mentioned one. For example, processing may be done using line memories and the like, or other configurations may be adopted.

Some or all of building elements may be implemented by software running on, e.g., a CPU.

The feature amount of image data may be extracted in units of pixels in place of blocks as in the first embodiment.

Moreover, code length adjustment is not limited to the method described in this embodiment. For example, a method of cutting off high-frequency DCT coefficients to obtain a large zero-runlength, or other methods may be used. Also, a method of replacing the code of the quantization coefficients, zero-runlength, and value without reconverting encoded data to pixel values may be used.

The code lengths of all objects are adjusted. However, the present invention is not limited to such specific method, but the code length of a specific object alone may be adjusted. For example, code length adjustment of a background image may be omitted, i.e., the decoder 222, background memory 223, and background encoder 227 may be omitted. Also, the ratio used in code length adjustment is not limited to the aforementioned one.

Third Embodiment

Figure 12:
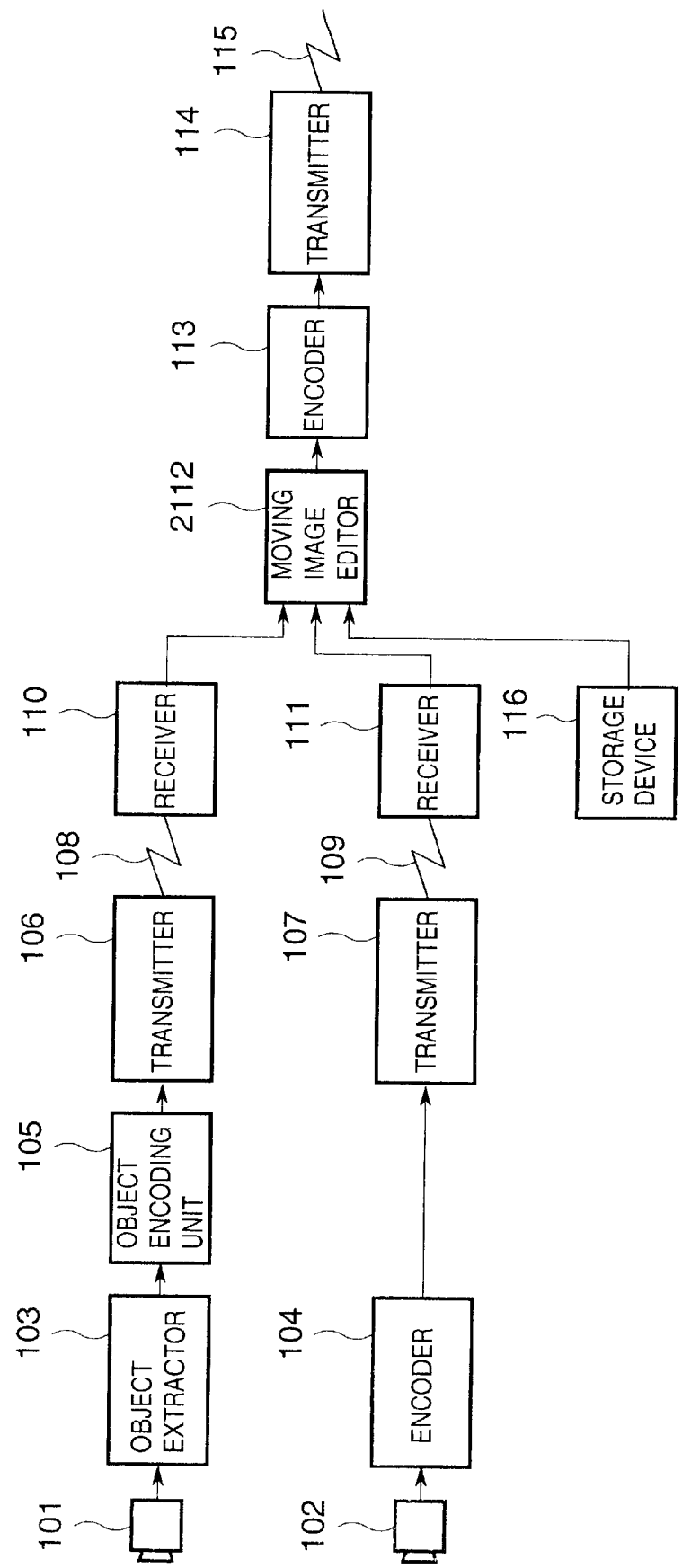
FIG. 12 is a block diagram showing the arrangement of a moving image transmission system according to the third embodiment of the present invention.

FIG. 12 is a block diagram showing the arrangement of a moving image transmission system according to the third embodiment of the present invention.

Note that the same reference numerals denote the same building elements as those in the first embodiment, and a detailed description thereof will be omitted.

Figure 13:
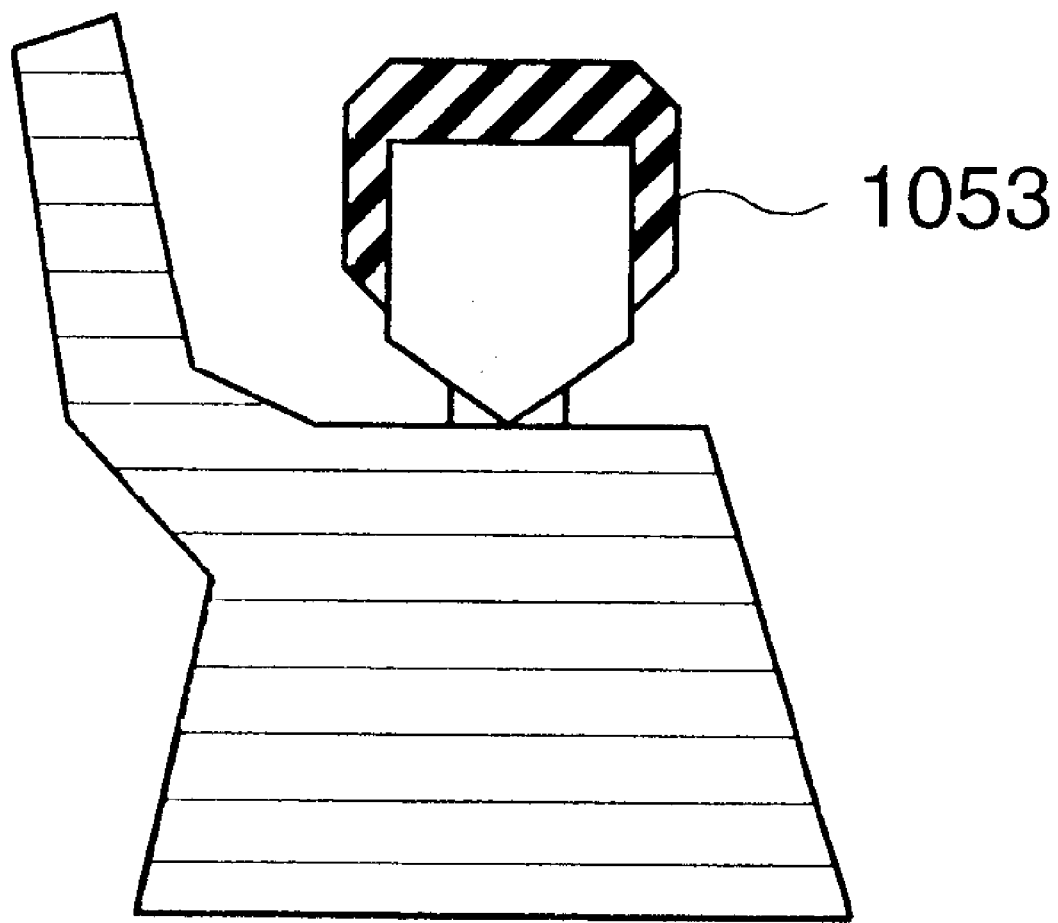
FIG. 13 shows an example of an object image in the third embodiment of the present invention.

Reference numeral 116 denotes a storage device for storing encoded data, which is encoded in advance. For example, the storage device 116 comprises a CD-ROM, magnetic disk, tape storage device, or the like, and can store any encoded data irrespective of their encoding schemes. In this embodiment, assume that the storage device especially stores encoded data formed by a sequence encoded by MPEG-4, and stores image data of a person 1053 which is extracted in advance, as shown in, e.g., FIG. 13. Reference numeral 2112 denotes a moving image editor of the third embodiment.

The detailed arrangement of the moving image editor 2112 of the third embodiment will be described below with reference to FIG. 14.

Figure 14:
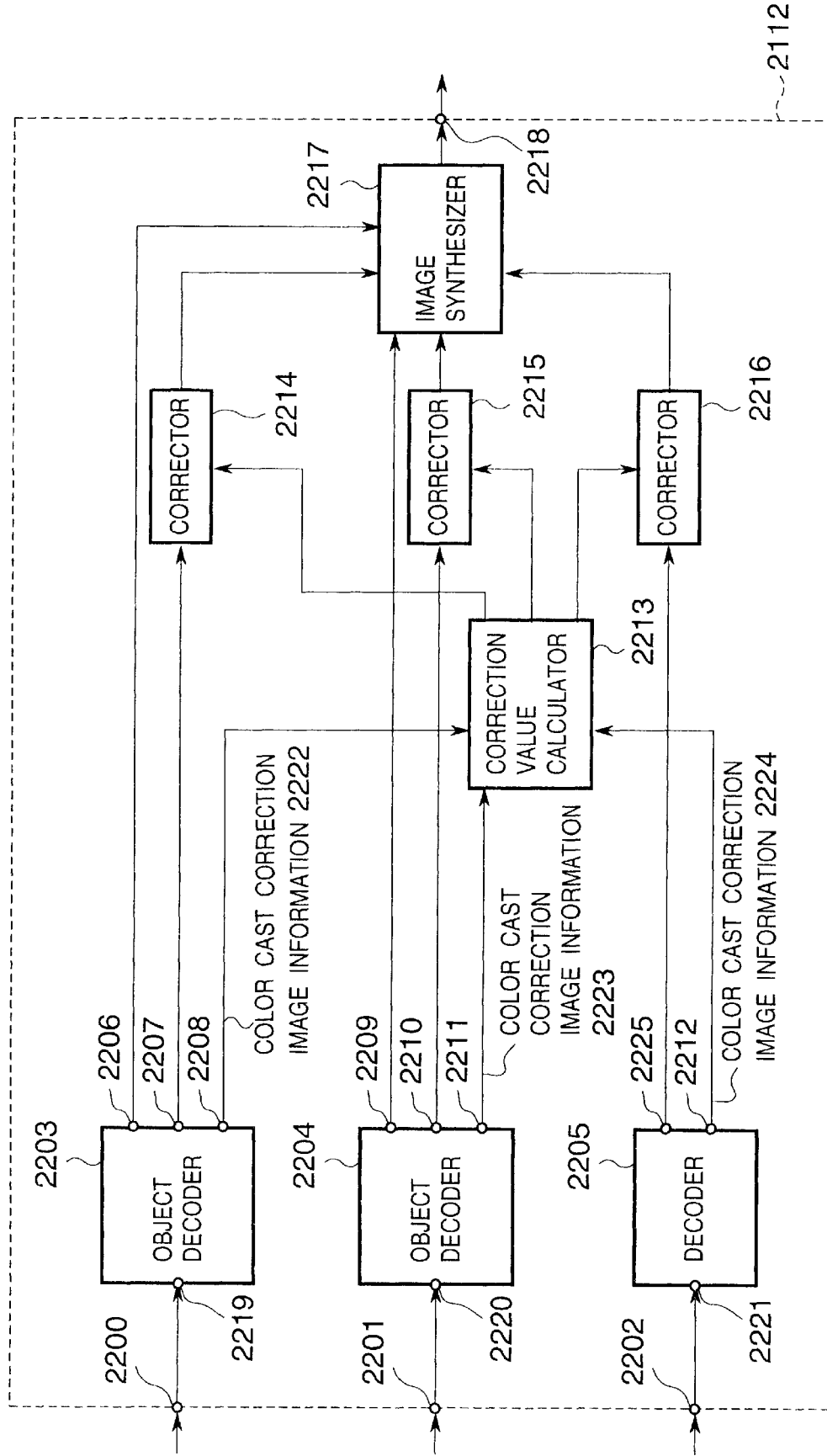
FIG. 14 is a block diagram showing the detailed arrangement of a moving image editor in the third embodiment of the present invention.

FIG. 14 is a block diagram showing the detailed arrangement of the moving image editor according to the third embodiment of the present invention.

Reference numerals 2200, 2201, and 2202 denote terminals. The terminals 2200, 2201, and 2202 respectively receive encoded data from the receiver 110, receiver 111, and storage device 116. These encoded data are input to terminals 2219, 2220, and 2221 of object decoders 2203 and 2204, and a decoder 2205, respectively. Terminals 2206, 2209, and 2225 output RGB image data. Terminals 2208, 2211, and 2212 output color cast correction information signals 2222, 2223, and 2224 required for calculating a color cast correction value. Terminals 2207 and 2210 output mask information. Reference numeral 2213 denotes a correction value calculator for calculating the correction value on the basis of the color cast correction image information.

Reference numerals 2214, 2215, and 2216 denote correctors for correcting color cast of image data on the basis of the correction value. Reference numeral 2217 denotes an image synthesizer for synthesizing image data on the basis of image data and mask information. Reference numeral 2218 denotes a terminal for outputting synthesized RGB image data to the encoder 113.

The detailed arrangement of the object decoders 2203 and 2204 of the third embodiment will be described below with reference to FIG. 15. Note that the detailed arrangement of the object decoder 2203 will be described using FIG. 15, and a detailed description of the object decoder 2204 having the same arrangement as the decoder 2203 will be omitted.

Figure 15:
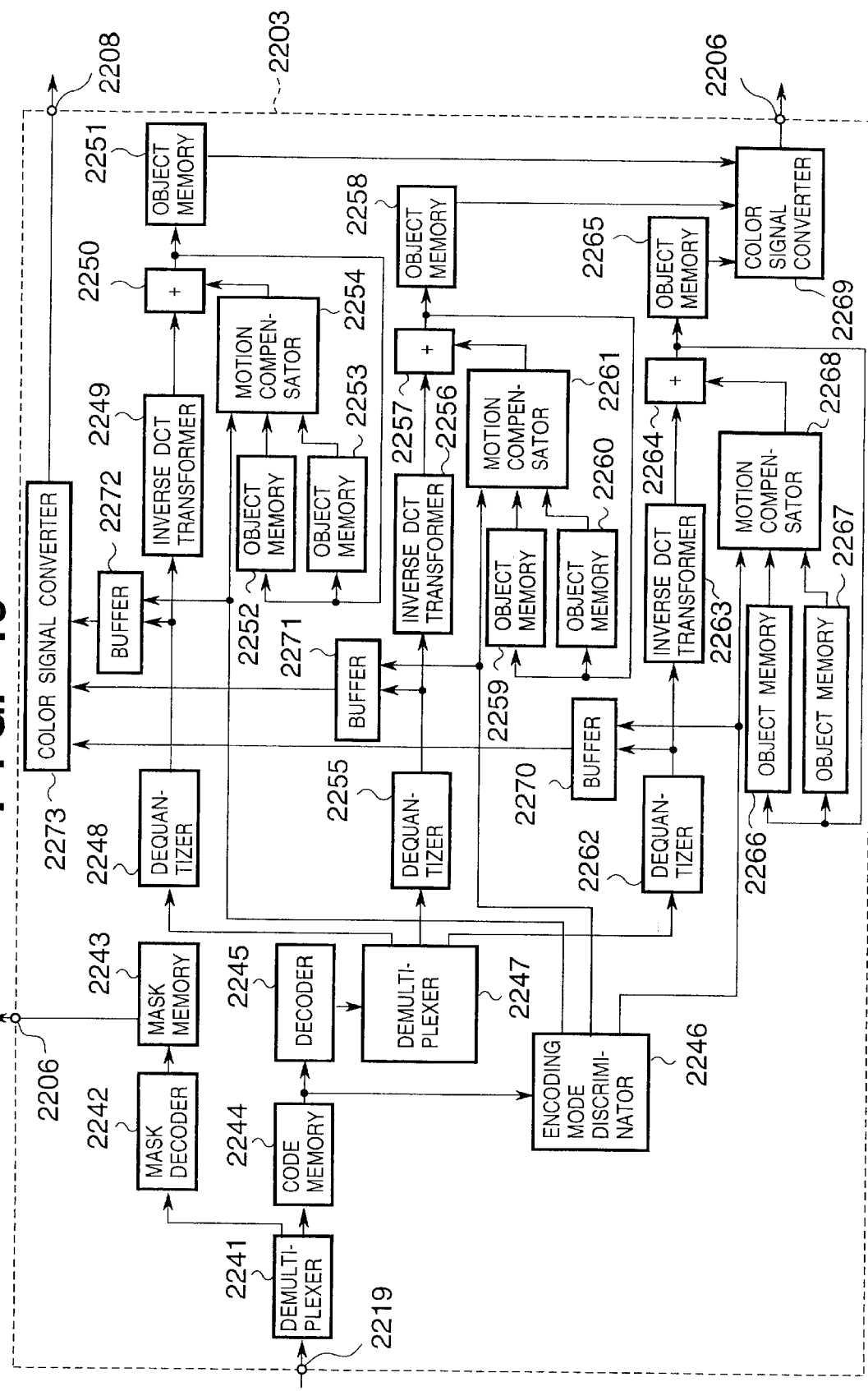
FIG. 15 is a block diagram showing the detailed arrangement of an object decoder in the third embodiment of the present invention.

FIG. 15 is a block diagram showing the detailed arrangement of the object decoder according to the third embodiment of the present invention.

Reference numeral 2219 denotes a terminal for receiving encoded data from the receiver 110. Reference numeral 2241 denotes a demultiplexer for demultiplexing encoded data of the mask information of that of the texture of the object image from the input encoded data. Reference numeral 2242 denotes a mask decoder for decoding the mask information. Reference numeral 2243 denotes a mask memory for storing the mask information. The mask information in the mask memory 2243 is output from the terminal 2207. Reference numeral 2244 denotes a code memory for storing the encoded data of the texture of the object image. Reference numeral 2245 denotes a decoder for decoding the encoded data of the texture of the object image. Reference numerals 2247 denotes demultiplexer for demultiplexing Y, Cb, and Cr image data from the decoded image data. Reference numeral 2246 denotes encoding mode discriminator for discriminating the encoding mode of a macroblock to be processed. Reference numerals 2248, 2255, and 2262 denote dequantizers. Reference numerals 2249, 2256, and 2263 denote inverse DCT transformers.

Reference numerals 2250, 2257, and 2264 denote adders. Reference numerals 2251, 2252, and 2253 denote object memories for storing luminance Y data of the texture of the reconstructed object image. Reference numerals 2258, 2259, and 2260 denote object memories for storing color difference Cb data of the texture of the reconstructed object image. Reference numerals 2265, 2266, and 2267 denote object memories for storing color difference Cr data of the texture of the reconstructed object image. Reference numerals 2254, 2261, and 2268 denote motion compensators. Reference numerals 2269 and 2273 denote color signal converters for converting color signals, i.e., Y, Cb, and Cr image data into R, G, and B image data. Reference numerals 2270, 2271, and 2272 denote buffers. Reference numeral 2207 denotes a terminal for outputting RGB image data. Reference numeral 2206 denotes a terminal for outputting the mask information. Reference numeral 2208 denotes a terminal for outputting color cast correction image information.

In the aforementioned arrangement, the demultiplexer 2241 demultiplexes encoded data of the mask information and that of the texture of the object image from the input encoded data, and inputs these encoded data to the mask decoder 2242 and code memory 2244, respectively. The mask decoder 2242 decodes the encoded data of the mask information to reconstruct mask information, and stores it in the mask memory 2243. The encoded data stored in the code memory 2244 is decoded by the decoder 2245 to reconstruct a quantized value, and is demultiplexed by the discriminator 2247 into luminance Y data, color difference Cb data, and color difference Cr data. The luminance Y data and color difference Cb and Cr data are respectively input to the dequantizers 2248, 2255, and 2262.

The luminance Y data is dequantized by the dequantizer 2248, and is inversely DCT-transformed by the inverse DCT transformer 2249. In case that a macroblock is discriminated an I-frame macroblock by the discriminator 2246, the motion compensator 2254 is inoperative, and outputs zero. In case of a P- or a B-frame macroblock discriminated by the discriminator 2246, the motion compensator 2254 is operative and outputs a motion compensation prediction value. The adder 2250 adds the output from the inverse DCT transformer 2249 and the output from the motion compensator 2254, and stores the sum data in the object memory 2251 and the object memory 2252 and 2253. On the other hand, only in I-frame, DC component information alone that represents the average value of the luminance Y data of the output from the dequantizer 2248 is stored in the buffer 2272.

The color difference Cb data is dequantized by the dequantizer 2255, and is inversely DCT-transformed by the inverse DCT transformer 2256. In case that a macroblock is discriminated an I-frame macroblock by the discriminator 2246, the motion compensator 2261 is inoperative, and outputs zero. In case of a P- or a B-frame macroblock discriminated by the discriminator 2246, the motion compensator 2261 is operative and outputs a motion compensation prediction value. The adder 2257 adds the output from the inverse DCT transformer 2256 and the output from the motion compensator 2261, and stores the sum data in the object memory 2258 and the object memory 2259 or 2260. On the other hand, only in I-frame, DC component information alone that represents the average value of the color difference Cb data of the output from the dequantizer 2255 is stored in the buffer 2271.

The color difference Cr data is dequantized by the dequantizer 2262, and is inversely DCT-transformed by the inverse DCT transformer 2263. In case that a macroblock is discriminated an I-frame macroblock by discriminator 2246, the motion compensator 2268 is inoperative, and outputs zero. In case of a P- or a B-frame macroblock discriminated by discriminator 2246, the motion compensator 2268 is operative and outputs a motion compensation prediction value. The adder 2264 adds the output from the inverse DCT transformer 2263 and the output from the motion compensator 2268, and stores the sum data in the object memory 2265 and the object memory 2266 or 2267. On the other hand, only in I-frame, DC component information alone that represents the average value of the color difference Cr data of the output from the dequantizer 2262 is stored in the buffer 2270.

Upon completion of macroblock processing, the luminance Y DC component information, color difference Cb DC component information, and color difference Cr DC component information are read out from the buffers 2272, 2271, and 2270, and are converted into RGB data by the color signal converter 2273, thus outputting the converted RGB data from the terminal 2208 as color cast correction image information.

Upon reading out Y, Cb, and Cr image data from the object memories 2251, 2258, and 2265, they are converted into R, G, and B image data by the color signal converter 2269, and the converted data are output from the terminal 2207.

The detailed arrangement of the decoder 2205 in the third embodiment will be described below with reference to FIG. 16.

Figure 16:
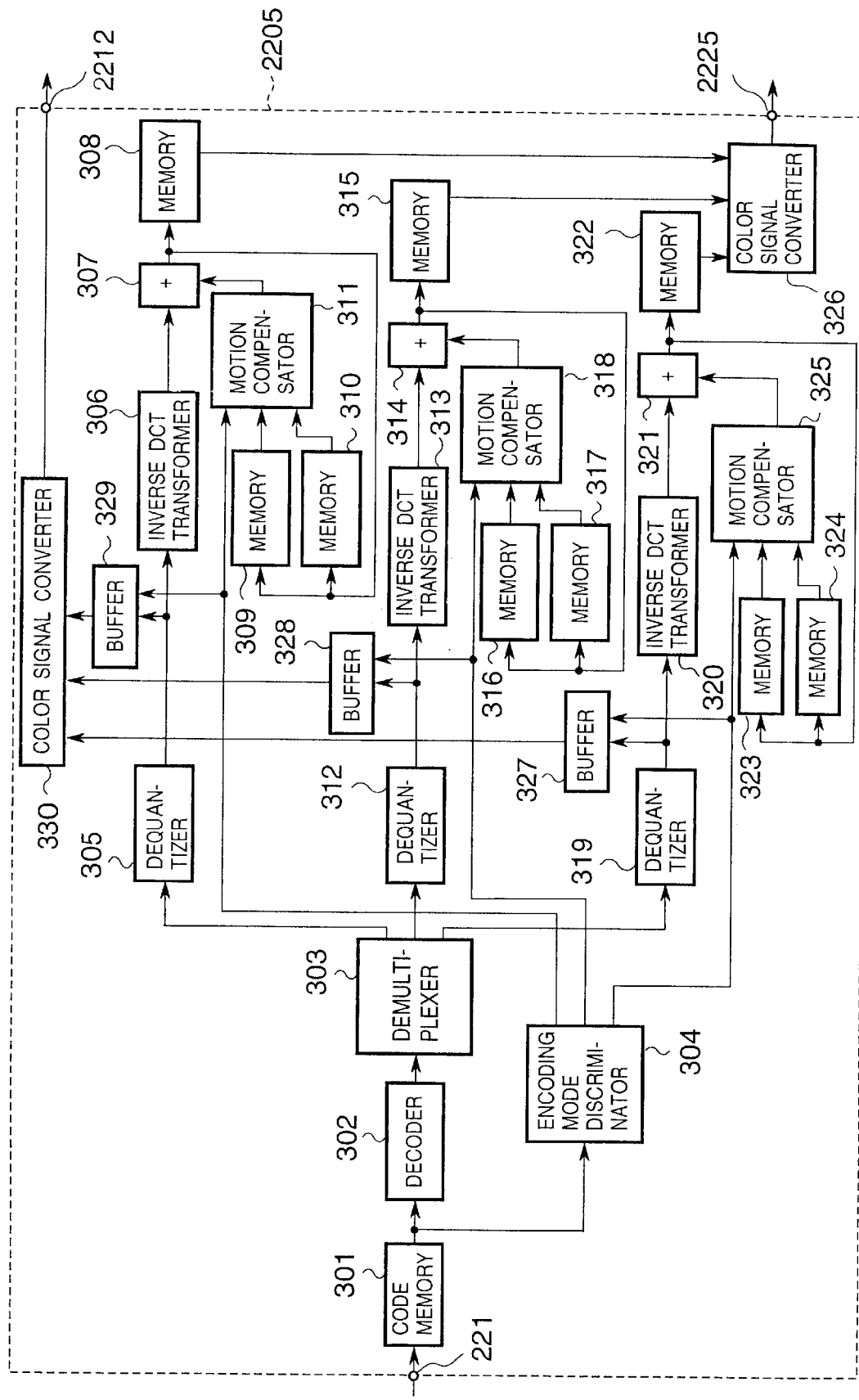
FIG. 16 is a block diagram showing the detailed arrangement of a decoder in the third embodiment of the present invention.

FIG. 16 is a block diagram showing the detailed arrangement of the decoder according to the third embodiment of the present invention.

Reference numeral 2221 denotes a terminal for receiving encoded data from the storage device 116. Reference numeral 301 denotes a code memory for storing encoded data. Reference numeral 302 denotes a decoder for decoding encoded data. Reference numeral 304 denotes demultiplexer for demultiplexing Y, Cb and Cr image data from the decoded image data. Reference numeral 303 denotes encoding mode discriminator for discriminating the encoding mode of a macroblock to be processed. Reference numerals 305, 312, and 319 denote dequantizers. Reference numerals 306, 313, and 320 denote inverse DCT transformers. Reference numerals 307, 314, and 321 denote adders. Reference numerals 308, 309, and 310 denote memories for storing luminance Y data of image data obtained by decoding the encoded data. Reference numeral 315, 316, and 317 denote memories for storing color difference Cb data of image data obtained by decoding the encoded data. Reference numerals 322, 323, and 324 denote memories for storing color difference Cr data of image data obtained by decoding the encoded data. Reference numerals 311, 318, and 325 denote motion compensators. Reference numerals 326 and 330 denote color signal converters for converting color signals, i.e., Y, Cb, and Cr image data into R, G, and B image data. Reference numerals 327, 328, and 329 denote buffers. Reference numeral 2225 denotes a terminal for outputting RBG image data. Reference numeral 2212 denotes a terminal for outputting color cast correction image information.

In the above arrangement, the encoded data stored in the code memory 301 is decoded by the decoder 302, and is demultiplexed by the demultiplexer 303 into luminance Y data, and color difference Cb and Cr data. The luminance Y data, and color difference Cb and Cr data are respectively input to the dequantizers 305, 312, and 319.

The luminance Y data is dequantized by the dequantizer 305, and is inversely DCT-transformed by the inverse DCT transformer 306. In case that a macroblock is discriminated an I-frame macroblock by discriminator 304, the motion compensator 311 is inoperative, and outputs zero. In case of a P- or a B-frame macroblock discriminated by discriminator 304, the motion compensator 311 is operative and outputs a motion compensation prediction value. The adder 307 adds the output from the inverse DCT transformer 306 and the output from the motion compensator 311, and stores the sum data in the memory 308 and the memory 309 or 310. On the other hand, only in I-frame, DC component information alone that represents the average value of the luminance Y data of the output from the dequantizer 305 is stored in the buffer 329.

The color difference Cb data is dequantized by the dequantizer 312, and is inversely DCT-transformed by the inverse DCT transformer 313. In case that a macroblock is discriminated an I-frame macroblock by the discriminator 304, the motion compensator 318 is inoperative, and outputs zero. In case of a P- or a B-frame macroblock discriminated by the discriminator 304, the motion compensator 318 is operative and outputs a motion compensation prediction value. The adder 314 adds the output from the inverse DCT transformer 313 and the output from the motion compensator 318, and stores the sum data in the memory 315 and the memory 316 or 317. On the other hand, only in I-frame, DC component information alone that represents the average value of the color difference Cb data of the output from the dequantizer 312 is stored in the buffer 328.

The color difference Cr data is dequantized by the dequantizer 319, and is inversely DCT-transformed by the inverse DCT transformer 320. In case that a macroblock is discriminated an I-frame macroblock by the discriminator 304, the motion compensator 325 is inoperative, and outputs zero. In case of a P- or a B-frame macroblock discriminated by the discriminator 304, the motion compensator 325 is operative and outputs a motion compensation prediction value. The adder 321 adds the output from the inverse DCT transformer 320 and the output from the motion compensator 325, and stores the sum data in the memory 322 and the memory 323 or 324. On the other hand, only in I-frame, DC component information alone that represents the average value of the color difference Cr data of the output from the dequantizer 319 is stored in the buffer 327.

Upon completion of macroblock processing, the luminance Y DC component information, color difference Cb DC component information, and color difference Cr DC component information are read out from the buffers 329, 328, and 327, and are converted into RGB data by the color signal converter 330, thus outputting the converted RGB data from the terminal 2112 as color cast correction image information.

Upon reading out Y, Cb, and Cr image data from the memories 308, 315, and 322, they are converted into R, G, and B image data by the color signal converter 326, and the converted data are output from the terminal 2225.

In the arrangement of the moving image editor 2212 described above, after image data are stored in the object memories 2251, 2258, and 2265 in the object decoder 2203, the object memories 2251, 2258, and 2265 in the object decoder 2204, and the memories 308, 315, and 322 in the decoder 2205 upon completion of decoding for one frame, the correction value calculator 2213 obtains the following correction formulas from a correction formula calculation algorithm (to be described later) using the color cast correction image information: more specifically, R, G, and B pixel value correction formulas f1R(x), f1G(x), and f1B(x) for the corrector 2214, R, G, and B pixel value correction formulas f2R(x), f2G(x), and f2B(x) for the corrector 2215, and R, G, and B pixel value correction formulas f3R(x), f3G(x), and f3B(x) for the corrector 2216.

After that, RGB pixel values are read out from the decoder 2205 by raster scan in the pixel order of a scan line, are corrected by the corrector 2216, and are then input to the image synthesizer 2217. The corrector 2216 corrects input R, G, and B pixel values r, g, and b using correction formulas f3R(x), f3G(x), and f3B(x) in accordance with:

$$R=f3R(r),\ G=f3G(g),\ B=f3B(b) \tag{6}$$

to obtain corrected R, G, and B pixel values R, G, and B, and outputs them.

On the other hand, when the scan position has reached the synthesis position of object image data in the object decoder 2203, the mask information and RGB pixel values are read out from the object decoder 2203, are corrected by the corrector 2214, and are the input to the image synthesizer 2217. The corrector 2214 corrects input R, G, and B pixel values r, g, and b using correction formulas f1R(x), f1G(x), and f1B(X) in accordance with:

$$R=f1R(r),\ G=f1G(g),\ B=f1B(b) \tag{7}$$

to obtain corrected, R, G, and B pixel values R, G, and B, and outputs them.

Furthermore, when the scan position has reached the synthesis position of object image data in the object decoder 2204, the mask information and RGB pixel values are read out from the object decoder 2204, are corrected by the corrector 2215, and are then input to the image synthesizer 2217. The corrector 2215 corrects input R, G, and B pixel values r, g, and b using correction formulas f2R(x), f2G(x), and f2B(X) in accordance with:

$$R=f2R(r),\ G=f2G(g),\ B=f2B(b) \tag{8}$$

to obtain corrected R, G, and B pixel values R, G, and B, and outputs them.

Figure 17:
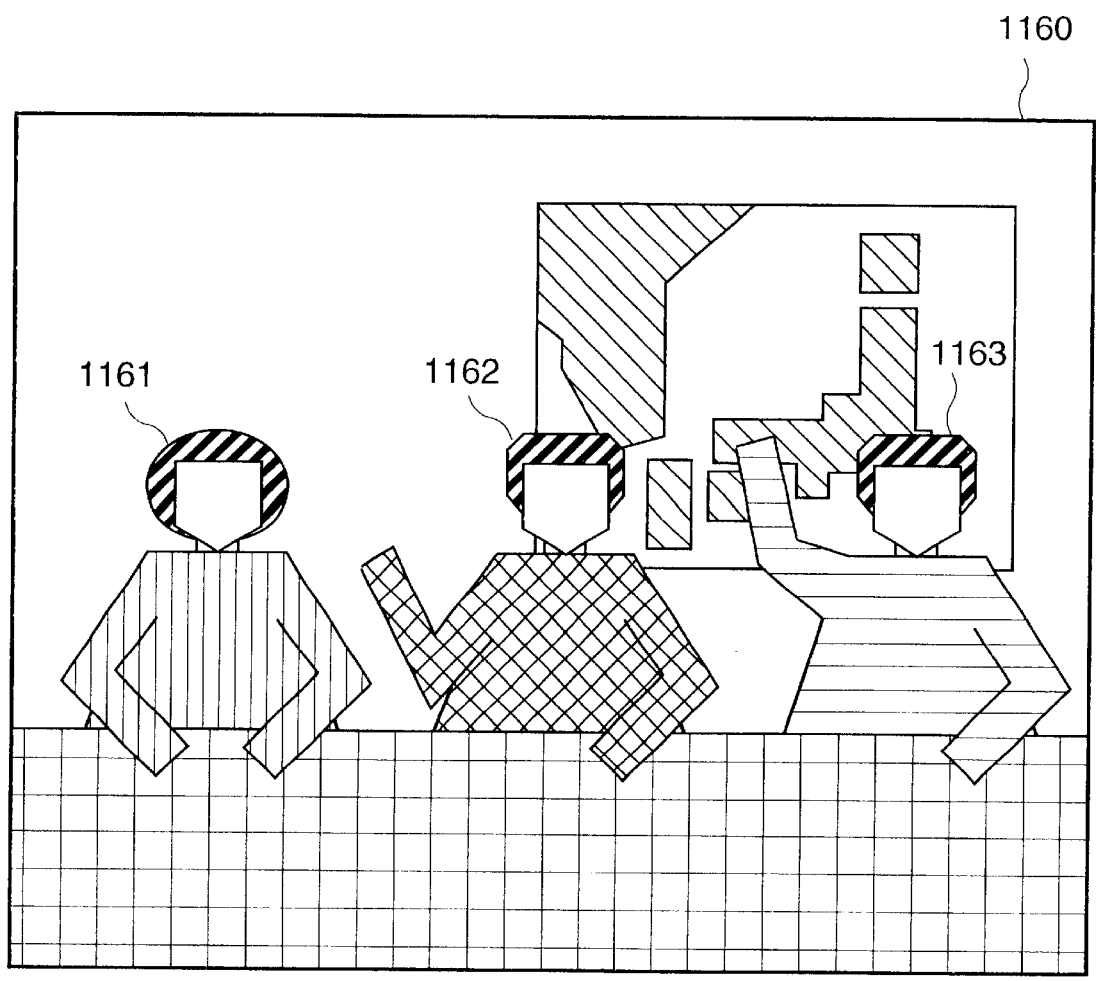
FIG. 17 shows an example of the synthesized result of an object image in the fourth embodiment of the present invention.

The image synthesizer 2217 synthesizes images by outputting pixel values from the corrector 2214 when the mask information indicates the object image data from the object decoder 2203; pixel values from the corrector 2215 when the mask information indicates the object image data from the object decoder 2204; and otherwise, pixel values from the corrector 2216. The image synthesizer 2217 then outputs the synthesized image data to the encoder 113 via the terminal 2218. FIG. 17 shows the synthesized result of images of a background 1160 and person 1061 obtained by correcting those of the background 1050 and the person 1051, an image of a person 1062 obtained by correcting that of the person 1052, and an image of a person 1063 obtained by correcting that of the person 1053. The encoder 113 encodes the output image data by MPEG-1, and outputs the encoded data onto the communication network 115 via the transmitter 114.

In the above operations, the correction formula calculation algorithm of the correction value calculator 2213 operates according to the following rules.

The correction formulas f3R(r), f3G(r), and f3B(r) for the corrector 2216 are calculated as follows.

The human eye is relatively insensible to blue, and a high correction effect is not expected. Hence, f3B(b) that corrects the B pixel value is given by:

$$f3B(b)=b \tag{9}$$

A maximum value RMax1, average value RE1, and variance RR1 of R information in the color cast correction image information 2224 from the decoder 2205 are calculated.

A maximum value GMax1, average value GE1, and variance GR1 of G information in the color cast correction image information 2224 from the decoder 2205 are calculated.

Subsequently, a two-dimensional histogram that represents the distribution of the R and G information values is calculated.

When |RE1−GE1| is equal to or lower than a given threshold value and |RR1−GR1| is equal to or lower than a given threshold value, if RMax1≧GMax1 and there is a significant offset to the R axis in a square region having a diagonal line (Rmax1, Rmax1)−(GMax1-T, GMax1-T) in the two-dimensional histogram, we have:

$$f3B(r)=r,\ f3G(g)=g\times RMax1/GMax1 \tag{10}$$

if GMax1≧RMax1 and there is a significant offset to the G axis in a square region having a diagonal line (Gmax1, Gmax1)–(RMax1-T, RMax1-T) in the two-dimensional histogram, we have:

$$f3G(g)=g,\ f3R(r)=r\times GMax1/RMax1 \quad (11)$$

otherwise, f3R(r) and f3G(g) are respectively given by:

$$f3R(r)=r,\ f3G(g)=g \quad (12)$$

where T is a given positive number.

Or else, f3R(r) for correcting the R pixel value and f3G(g) for correcting the G pixel value are respectively given by:

$$f3R(r)=r,\ f3G(g)=g \quad (13)$$

In this fashion, calculations of the correction formulas f3R(r), f3G(g), and f3B(b) are finished.

Likewise, the correction formulas f1R(r), f1G(g), and f1B(b) for the corrector 2214, and the correction formulas f2R(r), f2G(g), and f2B(b) for the corrector 2215 are calculated.

As evidenced by the above description, according to the third embodiment, an image including a background image and an object image, is separated into the background image and the object image, upon synthesizing encoded data of these images, feature amounts of these image data are extracted, and the pixel values of the object image to by synthesized are corrected, thus achieving image synthesis immune to incongruity. Also, high-speed processing can be attained since the average values in units of blocks are used in correction value calculations.

In the third embodiment, MPEG-4 is used for encoding the object image, and MPEG-1 is used for encoding other images. However, the present invention is not limited to such specific schemes, and any other encoding schemes may be used as long as they have the same functions as those of these schemes.

Furthermore, the memory configuration is not limited to the above-mentioned one. For example, processing may be done using line memories and the like, or other configurations may be adopted.

Some or all of building elements may be implemented by software running on, e.g., a CPU.

Fourth Embodiment

In the fourth embodiment, the object decoders 2203 and 2204, decoder 2205, and correction value calculator 2213 in the third embodiment are modified. Hence, a description of details common to the third embodiment will be omitted, and only modified portions will be explained.

The moving image transmission system uses the arrangement shown in FIG. 12 as in the third embodiment. Also, the moving image editor 2112 uses the arrangement shown in FIG. 14 as in the third embodiment.

The detailed arrangement of the object decoders 2203 and 2204 of the fourth embodiment will be described below using FIG. 18. Note that the detailed arrangement of the object decoder 2203 will be described using FIG. 18, and a detailed description of the object decoder 2204 having the same arrangement as the decoder 2203 will be omitted.

Figure 18:
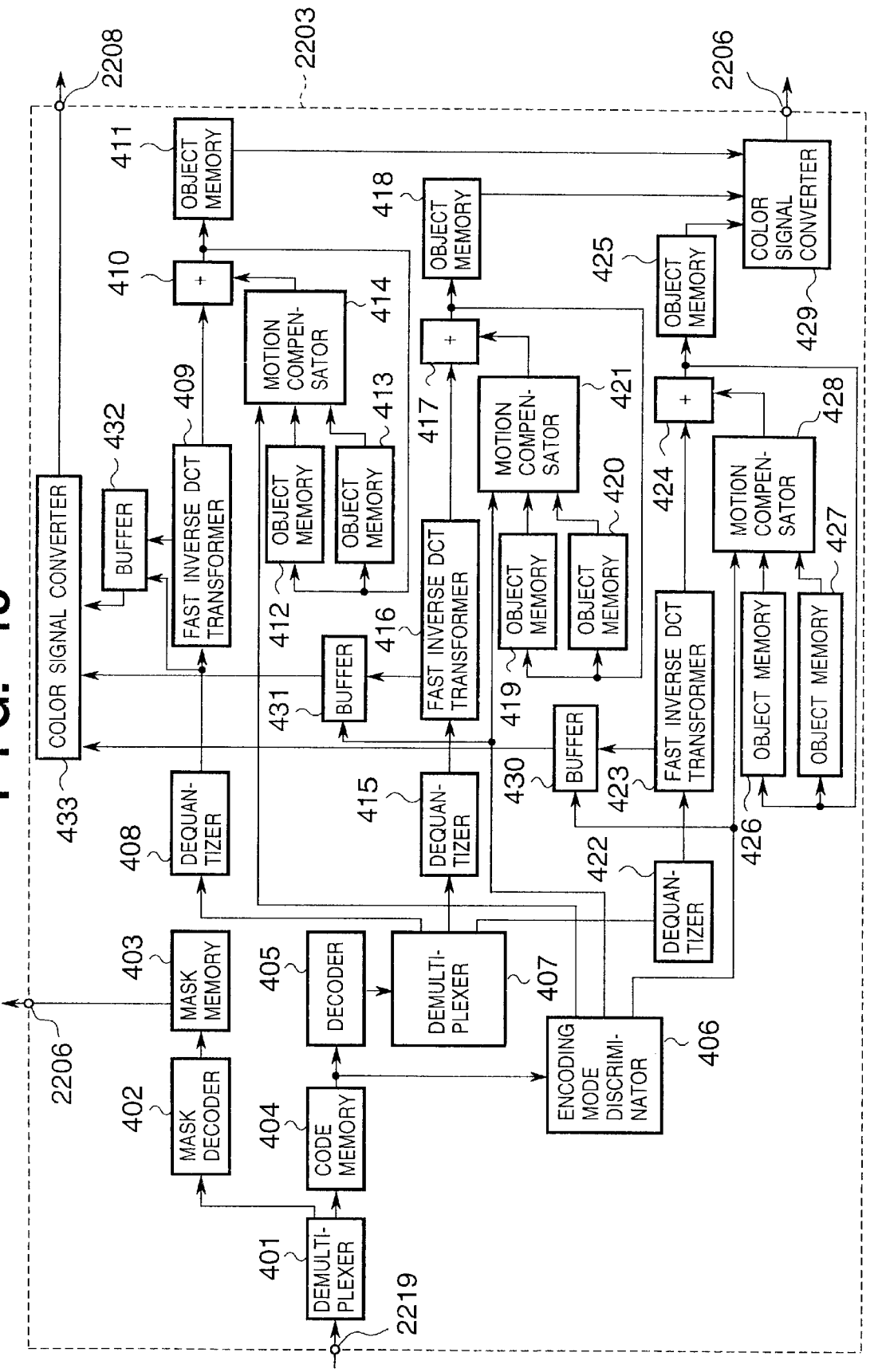
FIG. 18 is a block diagram showing the detailed arrangement of an object decoder according to the fourth embodiment of the present invention.

FIG. 18 is a block diagram showing the detailed arrangement of the object decoder according to the fourth embodiment of the present invention.

Reference numeral 2219 denotes a terminal for receiving encoded data from the receiver 110. Reference numeral 401 denotes a demultiplexer for demultiplexing encoded data of the mask information of that of the texture of the object image from the input encoded data. Reference numeral 402 denotes a mask decoder for decoding the mask information. Reference numeral 403 denotes a mask memory for storing the mask information. The mask information in the mask memory 403 is output from the terminal 2206. Reference numeral 404 denotes a code memory for storing the encoded data of the texture of the object image. Reference numeral 405 denotes a decoder for decoding the encoded data of the texture of the object image. Reference numeral 407 denotes demultiplexer for demultiplexing Y, Cb, and Cr image data form the decoded image data. Reference numeral 406 denotes encoding mode discriminators for discriminating the encoding mode of a macroblock to be processed. Reference numerals 408, 415, 422 denote dequantizers. Reference numerals 409, 416, and 423 denote fast inverse DCT transformers.

The detailed arrangement of the fast inverse DCT transformers 409, 416, and 423 in the fourth embodiment will be described below using FIG. 19.

FIG. 19 is a block diagram showing the detailed arrangement of the fast inverse DCT transformer according to the fourth embodiment of the present invention.

Referring to FIG. 19, the outputs of radix butterfly operators 1101 to 1104 have routes for multiplexing and outputting the outputs from the respective stages via a multiplexer 1105 in addition to normal radix butterfly operation routes. Note that only the DC component is input from a node before the first-stage radix butterfly operator 1101 to the multiplexer 1105. Also, a radix butterfly operation result of 2×2 low-frequency components is input from a node behind the second-stage radix butterfly operator 1102 to the multiplexer 1105. A radix butterfly operation result of 4×4 low-frequency components is input from a node behind the third-stage radix butterfly operator 1103 to the multiplexer 1105. Furthermore, an 8×8 inverse DCT result is input from a node behind the fourth-stage radix butterfly operator 1104 to the multiplexer 1105.

FIG. 18 will be explained again.

Reference numerals 410, 417, and 424 denote adders. Reference numerals 411, 412, and 413 denote object memories for storing luminance Y data of the texture of the reconstructed object image. Reference numerals 418, 419, and 420 denote object memories for storing color difference Cb data of the texture of the reconstructed object image. Reference numerals 425, 426, and 427 denote object memories for storing color difference Cr data of the texture of the reconstructed object image. Reference numerals 414, 421, and 428 denote motion compensators. Reference numerals 429 and 433 denote color signal converters for converting color signals, i.e., Y, Cb, and Cr image data into R, G, and B image data. Reference numerals 430, 431, and 432 denote buffers. Reference numeral 2207 denotes a terminal for outputting RGB image data. Reference numeral 2206 denotes a terminal for outputting the mask information. Reference numeral 2208 denotes a terminal for outputting color cast correction image information.

In the aforementioned arrangement, the demultiplexer 401 demultiplexes encoded data of the mask information and that of the texture of the object image from the input encoded data, and inputs these encoded data to the mask decoder 402 and code memory 404, respectively. The mask decoder 402 decodes the encoded data of the mask information to reconstruct mask information, and stores it in the mask memory 403. The encoded data stored in the code memory 404 is decoded by the decoder 405 to reconstruct a quantized value, and is demultiplexed by the discriminator 407 into luminance Y data, color difference Cb data, and color difference Cr data. The luminance Y data and color difference Cb and Cr data are respectively input to the dequantizers 408, 415, and 422.

The luminance Y data is dequantized by the dequantizer 408, and is inversely DCT-transformed by the radix butterfly operation in the fast inverse DCT transformer 409. In case that a macroblock is discriminated an I-frame macroblock by the discriminator 406, the motion compensator 414 is inoperative, and outputs zero. In case of a P- or a B-frame macroblock discriminated by the discriminator 406, the motion compensator 414 is operative and outputs a motion compensation prediction value. The adder 410 adds the output from the fast inverse DCT transformer 409 and the output from the motion compensator 414, and stores the sum data in the object memory 411 and the object memory 412 or 413. On the other hand, only in I-frame, after the radix butterfly operation results of the n-th stage are multiplexed and output from the fast inverse DCT transformer 409, image data consisting of only low-frequency components of the luminance Y data is stored in the buffer 432.

The color difference Cb data is dequantized by the dequantizer 415, and is inversely DCT-transformed by the radix butterfly operation in the fast inverse DCT transformer 416. In case that a macroblock is discriminated an I-frame macroblock by the discriminator 406, the motion compensator 421 is inoperative, and outputs zero. In case a P- or a B-frame macroblock discriminated by the discriminator 406, the motion compensator 421 is operative and outputs a motion compensation prediction value. The adder 417 adds the output from the fast inverse DCT transformer 416 and the output from the motion compensator 421, and stores the sum data in the object memory 418 and the object memory 419 or 420. On the other hand, only in I-frame, the radix butterfly operation result of the n-th stage is multiplexed and output from the fast inverse DCT transformer 416, and image data consisting of only low-frequency components of the color difference Cb data is stored in the buffer 431.

The color difference Cr data is dequantized by the dequantizer 422, and is inversely DCT-transformed by the radix butterfly operation in the fast inverse DCT transformer 423. In case that a macroblock is discriminated an I-frame macroblock by the discriminator 406, the motion compensator 428 is inoperative, and outputs zero. In case of a P- or a B-frame macroblock discriminated by the discriminator 406, the motion compensator 428 is operative and outputs a motion compensation prediction value. The adder 424 adds the output from the fast inverse DCT transformer 423 and the output from the motion compensator 428, and stores the sum data in the object memory 425 and the object memory 426 or 427. On the other hand, only in I-frame, the radix butterfly operation result of the n-th stage is multiplexed and output from the fast inverse DCT transformer 423, and image data consisting of only low-frequency components of the color difference Cr data is stored in the buffer 430.

Upon completion of macroblock processing, the luminance Y data, and color difference Cb and Cr data are read out from the buffers 432, 431, and 430, and are converted into RGB data by the color signal converter 433, thus outputting the converted RGB data from the terminal 2208 as color cast correction image information.

Upon reading out Y, Cb, and Cr image data from the object memories 411, 418, and 425, they are converted into R, G, and B image data by the color signal converter 429, and the converted data are output from the terminal 2207.

The detailed arrangement of the decoder 2205 in the fourth embodiment will be described below with reference to FIG. 20.

Figure 20:
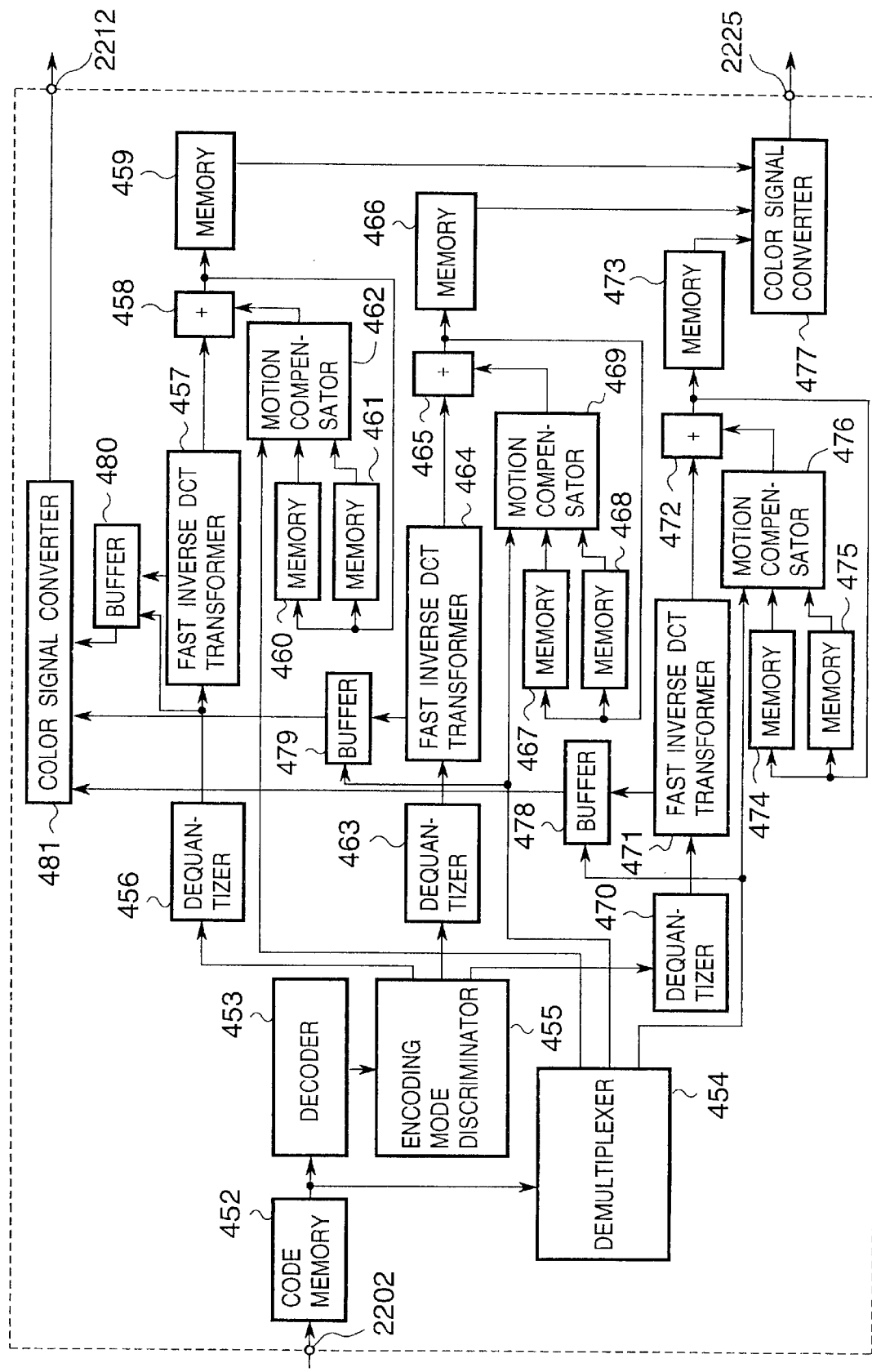
FIG. 20 is a block diagram showing the detailed arrangement of a decoder in the fourth embodiment of the present invention.

FIG. 20 is a block diagram showing the detailed arrangement of the decoder according to the fourth embodiment of the present invention.

Reference numeral 2202 denotes a terminal for receiving encoded data from the storage device 116. Reference numeral 452 denotes a code memory for storing encoded data. Reference numeral 453 denotes a decoder for decoding encoded data. Reference numeral 455 denotes demultiplexer for demultiplexing Y, Cb, and Cr image data from the decoded image data. Reference numeral 454 denotes encoding mode discriminators for discriminating the encoding mode of a macroblock to be processed. Reference numerals 456, 463, and 470 denote dequantizers. Reference numerals 457, 464, 471 denote fast inverse DCT transformers. Note that the fast inverse DCT transformers 457, 464, and 471 have the same detailed arrangement as that shown in FIG. 19. Reference numerals 458, 465, and 472 denote adders. Reference numerals 459, 460, and 461 denote memories for storing luminance Y data of image data obtained by decoding the encoded data. Reference numerals 466, 467, and 468 denote memories for storing color difference Cb data of image data obtained by decoding the encoded data. Reference numerals 473, 474, and 475 denote memories for storing color difference Cr data of image data obtained by decoding the encoded data. Reference numerals 462, 469, and 476 denote motion compensators. Reference numerals 477 and 481 denote color signal converters for converting color signals, i.e., Y, Cb, and Cr image data into R, G, and B image data. Reference numerals 478, 479, and 480 denote buffers. Reference numeral 2225 denotes a terminal for outputting RGB image data. Reference numeral 2212 denotes a terminal for outputting color cast correction image information.

In the above arrangement, the encoded data stored in the code memory 452 is decoded by the decoder 453, and is demultiplexed by the demultiplexer 455 into luminance Y data, and color difference Cb and Cr data. The luminance Y data, and color difference Cb and Cr data are respectively input to the dequantizers 456, 463, and 470.

The luminance Y data is dequantized by the dequantizer 456, and is inversely DCT-transformed by radix butterfly operation in the fast inverse DCT transformer 457. In case of that macroblock is discriminated an I-frame macroblock by the discriminator 454, the motion compensator 462 is inoperative, and outputs zero. In case of a P- or a B-frame macroblock discriminator by the discriminator 454, the motion compensator 462 is operative and outputs a motion compensation prediction value. The adder 458 adds the output from the fast inverse DCT transformer 457 and the output from the motion compensator 462, and stores the sum data in the memory 459 and the memory 460 or 461. On the other hand, only in I-frame, after the radix butterfly operation results of the n-th stage are multiplexed and output from the fast inverse DCT transformer 457, image data consisting of only low-frequency components of the luminance Y data is stored in the buffer 480.

The color difference Cb data is dequantized by the dequantizer 463, and is inversely DCT-transformed by radix butterfly operation in the fast inverse DCT transformer 464. In case that a macroblock is discriminated an I-frame macroblock by the discriminator 454, the motion compensator 469 is inoperative, and outputs zero. In case of a P- or a B-frame frame macroblock by the discriminator 454, the motion compensator 469 is operative and outputs a motion compensation prediction value. The adder 465 adds the output from the fast inverse DCT transformer 464 and the output from the motion compensator 469, and stores the sum data in the memory 466 and the memory 467 or 468. On the other hand, only in I-frame, after the radix butterfly operation results of the n-th stage are multiplexed and output from the fast inverse DCT transformer 464, image data consisting of only low-frequency components of the color difference Cr data is stored in the buffer 479.

The color difference Cr data is dequantized by the dequantizer 470, and is inversely DCT-transformed by radix butterfly operation in the fast inverse DCT transformer 471. In case that a macroblock discriminated an I-frame macroblock by the discriminator 454, the motion compensator 476 is inoperative, and outputs zero. In case of a P- or a B-frame macroblock discriminated by the discriminator 454, the motion compensator 476 is operative and outputs a motion compensation prediction value. The adder 472 adds the output from the fast inverse DCT transformer 471 and the output from the motion compensator 476, and stores the sum data in the memory 473 and the memory 474 or 475. On the other hand, only in I-frame, after the radix butterfly operation results of the n-th stage are multiplexed and output from the fast inverse DCT transformer 471, image data consisting of only low-frequency components of the color difference Cb data is stored in the buffer 478.

Upon completion of macroblock processing, the luminance Y DC component information, color difference Cb DC component information, and color difference Cr DC component information are read out from the buffers 480, 479, and 478, and are converted into RGB data by the color signal converter 481, thus outputting the converted RGB data from the terminal 2212 as color cast correction image information.

Upon reading out Y, Cb, and Cr image data from the memories 459, 466, and 473, they are converted into R, G, and B image data by the color signal converter 477, and the converted data are output from the terminal 2225.

In the arrangement of the moving image editor 2112 described above, after image data are stored in the object memories 411, 418, and 425 in the object decoder 2203, the object memories 411, 418, and 425 in the object decoder 2204, and the memories 459, 466, and 473 in the decoder 2205 upon completion of decoding for one frame, the correction value calculator 2213 obtains the following correction formulas from a correction formula calculation algorithm (to be described later) using the color cast correction image information: more specifically, R, G, and B pixel value correction formulas F1R(x), F1G(x), and F1B(x) for the corrector 2214, R, G, and B pixel value correction formulas F2R(x), F2G(x), and F2B(x) for the corrector 2215, and R, G, and B pixel value correction formulas F3R(x), F3G(x), and F3B(x) for the corrector 2216.

After that, RGB pixel values are read out from the decoder 2205 by raster scan in the pixel order of a scan line, are corrected by the corrector 2216, and are then input to the image synthesizer 2217. The corrector 2216 corrects input R, G, and B pixel values r, g, and b using correction formulas F3R(x), F3G(x), and F3B(x) in accordance with:

$$R=F3R(r),\ G=F3G(g),\ B=F3B(b) \qquad (14)$$

to obtain corrected R, G, and B pixel values R, G, and B, and outputs them.

On the other hand, when the scan position has reached the synthesis position of object image data in the object decoder 2203, the mask information and RGB pixel values are read out from the object decoder 2203, are corrected by the corrector 2214, and are then input to the image synthesizer 2217. The corrector 2214 corrects input R, G, and B pixel values r, g, and b using correction formulas F1R(x), F1G(x), and F1B(x) in accordance with:

$$R=F1R(r),\ G=F1G(g),\ B=F1B(b) \qquad (15)$$

to obtain corrected R, G, and B pixel values R, G, and B, and outputs them.

Furthermore, when the scan position has reached the synthesis position of object image data in the object decoder 2204, the mask information and RGB pixel values are read out from the object decoder 2204, are corrected by the corrector 2215, and are then input to the image synthesizer 2217. The corrector 2215 corrects input R, G, and B pixel values r, g, and b using correction formulas F2R(x), F2G(x), and F2B(x) in accordance with:

$$R=F2R(r),\ G=F2G(g),\ B=F2B(b) \qquad (16)$$

to obtain corrected R, G, and B pixel values R, G, and B, and outputs them.

The image synthesizer 2217 synthesizes images by outputting pixel values from the corrector 2214 when the mask information indicates the object image data from the object decoder 2203; pixel values from the corrector 2215 when the mask information indicates the object image data from the object decoder 2204; and otherwise, pixel values from the corrector 2216. The image synthesizer 2217 then outputs the synthesized image data to the encoder 113 via the terminal 2218. FIG. 17 shows the synthesized result of images of a background 1160 and person 1061 obtained by correcting those of the background 1050 and the person 1051, an image of a person 1062 obtained by correcting that of the person 1052, and an image of a person 1063 obtained by correcting that of the person 1053. The encoder 113 encodes the output image data by MPEG-1, and outputs the encoded data onto the communication network 115 via the transmitter 114.

In the above operations, the correction formula calculation algorithm of the correction value calculator 2213 operates according to the following rules.

The correction formulas F3R(r), F3G(r), and F3B(r) for the corrector 2216 are calculated as follows.

The human eye is relatively insensible to blue, and a high correction effect is not expected. Hence, F3B(b) that corrects a B pixel value is given by:

$$F3B(b)=b \qquad (17)$$

A maximum value RMax1, average value RE1, and variance RR1 of R information in the color cast correction image information 2224 from the decoder 2205 are calculated.

A maximum value GMax1, average value GE1, and variance GR1 of G information in the color cast correction image information 2224 from the decoder 2205 are calculated.

Subsequently, a two-dimensional histogram that represents the distribution of the R and G information values is calculated.

When |RE1−GE1| is equal to or lower than a given threshold value and |RR1−GR1| is equal to or lower than a given threshold value.

if RMax1≧GMax1 and there is a significant offset to the R axis in a square region having a diagonal line (Rmax1, Rmax1)–(GMax1−T, GMax1−T) in the two-dimensional histogram, ^F3R(x) and ^F3G(x) are respectively given by:

$$\hat{F}3R(r)=r,\ \hat{F}3G(g)=g\times RMax1/GMax1 \quad (18)$$

if GMax1≧RMax1 and there is a significant offset to the G axis in a square region having a diagonal line (Gmax1, Gmax1)–(RMax1−T, RMax1−T) in the two-dimensional histogram, ^F3G(x) and ^F3R(x) are respectively given by:

$$\hat{F}3G(g)=g,\ \hat{F}3R(r)=r\times GMax1/RMax1 \quad (19)$$

Otherwise, ^F3R(x) and ^F3G(x) are respectively given by:

$$\hat{F}3R(r)=r,\ \hat{F}3G(g)=g \quad (20)$$

where T is a given positive number.

Or else, ^F3R(x) and ^F3G(x) are respectively given by:

$$\hat{F}3R(r)=r,\ \hat{F}3G(g)=g \quad (21)$$

Classifications based on |RE1−GE1| and |RR1−GR1| have been explained.

Based on correction formulas one frame before, current correction formulas are defined by:

$$F3R(r)=F3R(r)+\gamma(\hat{F}3R(r)-F3R(r))$$

$$F3G(g)=F3G(g)+\gamma(\hat{F}3G(g)-F3G(g)) \quad (22)$$

where γ is a weighting variable for tracking changes in correction formula along an elapse of time.

In this fashion, calculations of the correction formulas F3R(r), F3G(g), and F3B(b) are finished.

Likewise, the correction formulas F1R(r), F1G(g), F1B(b) for the corrector 2214, and the correction formulas F2R(r), F2G(g), F2B(b) for the corrector 2215 are calculated.

As described above, according to the fourth embodiment, an image including a background image and an object image, is separated into the background image and the object image, upon synthesizing encoded data of these images, feature amounts of these image data are extracted, and the pixel values of the object image to be synthesized are corrected, thus achieving image synthesis immunue to incongruity. Also, in consideration of the balance between the object image size and operation speed, the inverse DCT of DC components, the inverse DCT of 2×2 or 4×4 low-frequency components, or the 8×8 inverse DCT can be selectively used in calculating correction values, thus assuring flexible, accurate processing. Furthermore, since color cast correction is made to slowly track changes along with an elapse of time, image synthesis can be done without the sense of incongruity even for images that change considerably.

In the fourth embodiment, MPEG-4 is used for encoding the object image, and MPEG-1 is used for encoding other images. However, the present invention is not limited to such specific schemes, and any other encoding schemes may be used as long as they have the same functions as those of these schemes.

Furthermore, the memory configuration is not limited to the above-mentioned one. For example, processing may be done using line memories and the like, or other configurations may be adopted.

Some or all of building elements may be implemented by software running on, e.g., a CPU.

Fifth Embodiment

In the fifth embodiment, the moving image editor 2112 of the third embodiment is modified. Hence, a description of details common to the third embodiment will be omitted, and only modified portions will be explained.

A moving image transmission system of this embodiment uses the arrangement shown in FIG. 12 as in the third embodiment.

The detailed arrangement of the moving image editor 2112 of the fifth embodiment will be described below using FIG. 21.

Figure 21:
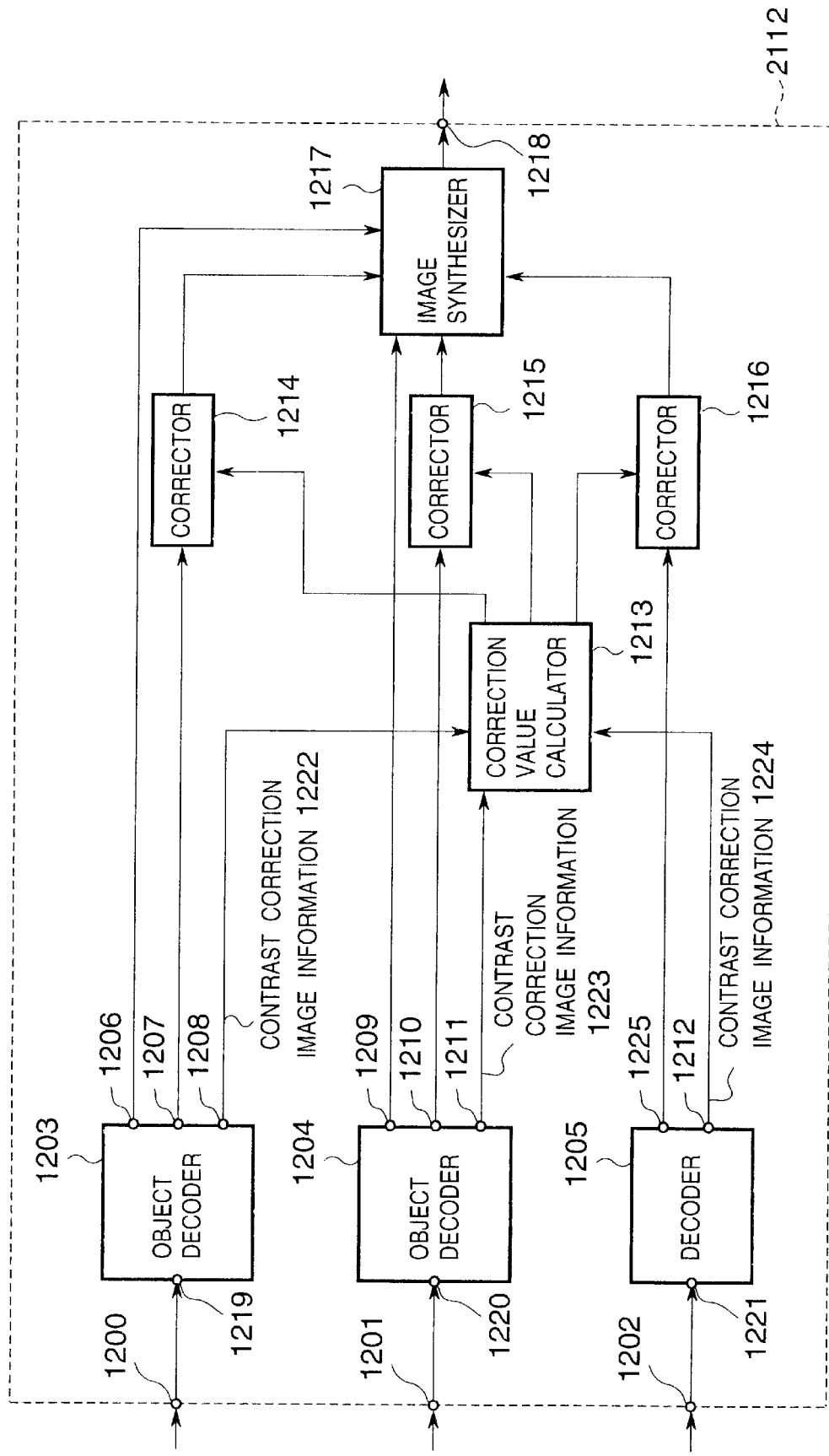
FIG. 21 is a block diagram showing the detailed arrangement of a moving image editor in the fifth embodiment of the present invention.

FIG. 21 is a block diagram showing the detailed arrangement of the moving image editor according to the fifth embodiment of the present invention.

Reference numerals 1200, 1201, and 1202 denote terminals. The terminals 1200, 1201, and 1202 respectively receive encoded data from the receiver 110, receiver 111, and storage device 116. These encoded data are input to object decoders 1203 and 1204, and a decoder 1205. Image data are output from terminals 1207, 1210, and 1225. Terminals 1208, 1211, and 1212 respectively output contrast correction image information signals 1222, 1223, and 1224. Terminals 1206 and 1209 output mask information. Reference numeral 1213 denotes a correction value calculator for calculating the correction value on the basis of the contrast correction image information. Reference numerals 1214, 1215, and 1216 denote correctors for correcting color cast of image data on the basis of the correction value. Reference numeral 1217 denotes an image synthesizer for synthesizing image data on the basis of image data and mask information. Reference numeral 1218 denotes a terminal for outputting synthesized RGB image data to the encoder 113.

The detailed arrangement of the object decoders 1203 and 1204 of the fifth embodiment will be described below with reference to FIG. 22. Note that the detailed arrangement of the object decoder 1203 will be described using FIG. 22, and a detailed description of the object decoder 1204 having the same arrangement as the decoder 1203 will be omitted.

Figure 22:
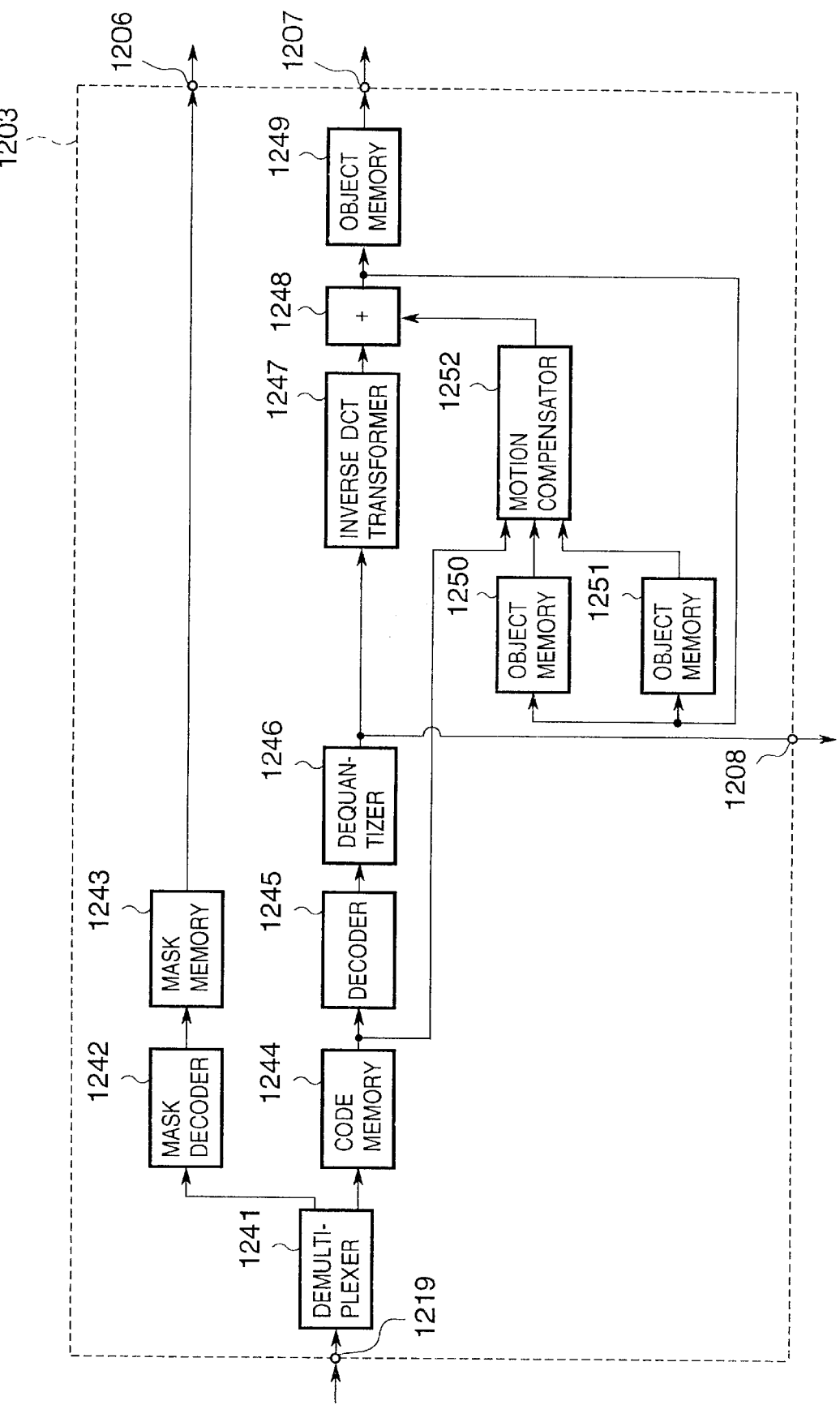
FIG. 22 is a block diagram showing the detailed arrangement of an object decoder according to the fifth embodiment of the present invention.

FIG. 22 is a block diagram showing the detailed arrangement of the object decoder according to the fifth embodiment of the present invention.

Reference numeral 1219 denotes a terminal for receiving encoded data from the receiver 110. Reference numeral 1241 denotes a demultiplexer for demultiplexing encoded data of mask information of that of the texture of an object image from the input encoded data. Reference numeral 1242 denotes a mask decoder for decoding the mask information. Reference numeral 1243 denotes a mask memory for storing the mask information. The mask information in the mask memory 1243 is output from the terminal 1206. Reference numeral 1244 denotes a code memory for storing the encoded data of the texture of the object image. Reference numeral 1245 denotes a decoder for decoding the encoded data of the texture of the object image. Reference numeral 1246 denotes a dequantizer. DC information in the dequantized image data is output from the terminal 1208 as contrast correction image information. Reference numeral 1247 denotes an inverse DCT transformer. Reference numeral 1248 denotes an adder. Reference numerals 1249, 1250, and 1251 denote object memories for storing image data of the texture of the reconstructed object image. Reference numeral 1252 denotes a motion compensator. Image data in the object memory 1249 is output from the terminal 1207.

In the aforementioned arrangement, the demultiplexer 1241 demultiplexes encoded data of the mask information and that of the texture of the object image from the input encoded data, and inputs these encoded data to the mask decoder 1242 and code memory 1244, respectively. The mask decoder 1242 decodes the encoded data of the mask information to reconstruct mask information, and stores it in the mask memory 1243. The encoded data stored in the code memory 1244 is decoded by the decoder 1245 to reconstruct a quantized value. This value is dequantized by the dequantizer 1246, and is inversely DCT-transformed by the inverse DCT transformer 1247. In case of an I-frame macroblock, the motion compensator 1252 is inoperative, and outputs zero. In case of a macroblock to be motion-compensated in P- or B-frame, the motion compensator 1252 is operative and outputs a motion compensation prediction value. The adder 1248 adds the output from the inverse DCT transformer 1247 and the output from the motion compensator 1252, and stores the sum data in the object memory 1249 and the object memory 1250 or 1251. On the other hand, the dequantizer 1246 outputs DC components that represent the average value of the luminance data from the terminal 1208.

The detailed arrangement of the decoder 1205 in the fifth embodiment will be described below with reference to FIG. 23.

Figure 23:
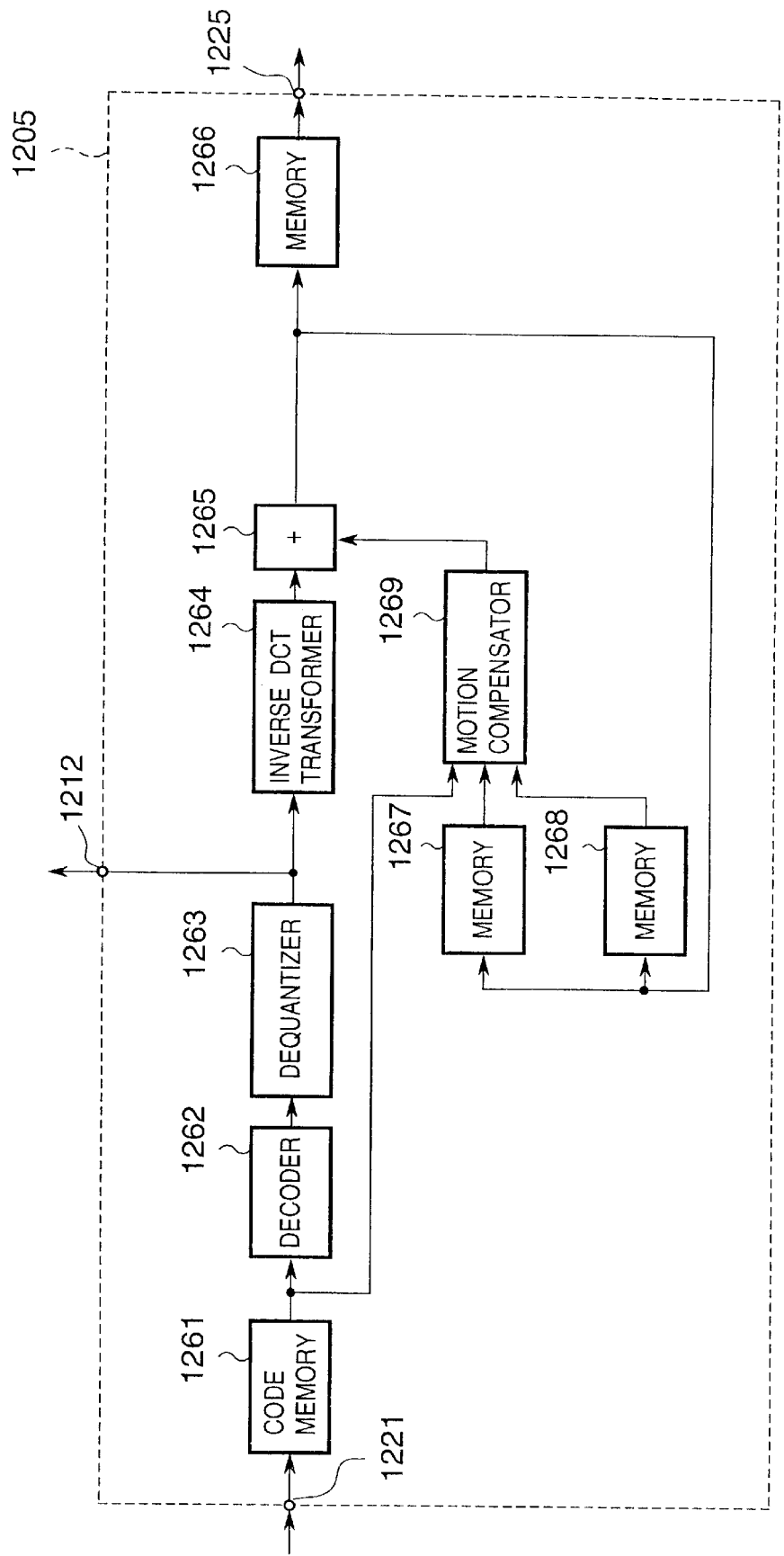
FIG. 23 is a block diagram showing the detailed arrangement of a decoder according to the fifth embodiment of the present invention.

FIG. 23 is a block diagram showing the detailed arrangement of the decoder according to the fifth embodiment of the present invention.

Reference numeral 1221 denotes a terminal for receiving encoded data from the storage device 116. Reference numeral 1261 denotes a code memory for storing encoded data. Reference numeral 1262 denotes a decoder for decoding encoded data. Reference numeral 1263 denotes a dequantizer. DC information in the dequantized image data is output from the terminal 1212 as contrast correction image information. Reference numeral 1264 denotes an inverse DCT transformer. Reference numeral 1265 denotes an adder. Reference numerals 1266, 1267, and 1268 denote memories for storing decoded image data. Reference numeral 1269 denotes a motion compensator. Image data in the memory 1266 is output from the terminal 1225.

In the above arrangement, the encoded data stored in the code memory 1261 is decoded by the decoder 1262 to reconstruct a quantized value. This value is dequantized by the dequantizer 1263 and is inversely DCT-transformed by the inverse DCT transformer 1264. In case of an I-frame macroblock, the motion compensator 1269 is inoperative, and outputs zero. In case of a macroblock to be motion-compensated in P- or B-frame, the motion compensator 1269 is operative and outputs a motion compensation prediction value. The adder 1265 adds the output from the inverse DCT transformer 1264 and the output from the motion compensator 1269, and stores the sum data in the memory 1266 and the memory 1267 or 1268. On the other hand, the dequantizer 1263 outputs DC components that represent the average value of luminance data from the terminal 1212 as contrast correction image information.

In the arrangement of the moving image editor 2112 mentioned above, after image data are stored in the object memories 1249 in the object decoders 1203 and 1204, and the memory 1266 in the decoder 1205 upon completion of decoding for one frame, the correction value calculator 1213 obtains the following correction formulas from a correction formula calculation algorithm (to be described later) using the color cast correction image information: correction formulas $f1(x)$, $f2(x)$, and $f3(x)$ respectively for the correctors 1214, 1215, and 1216.

After that, pixel values are read out from the memory 1266 in the decoder 1205 by raster scan in the pixel order of a scan line, are corrected by the corrector 1216, and are then input to the image synthesizer 1217. The corrector 1216 corrects an input pixel value p using correction formulas $f3(x)$ to obtain a corrected pixel value P:

$$P=f3(p) \qquad (23)$$

and outputs it.

On the other hand, when the scan position has reached the synthesis position of object image data in the object decoder 1203, the mask information and image data are read out from the mask memory 1243 and object memory 1249 in the object decoder 1203, are corrected by the corrector 1214, and are then input to the image synthesizer 1217. The corrector 1214 corrects an input pixel value p using correction formulas $f1(x)$ to obtain a corrected pixel value P:

$$P=f1(p) \qquad (24)$$

and outputs it.

When the scan position has reached the synthesis position of object image data in the object decoder 1204, the mask information and image data are read out from the mask memory 1243 and object memory 1249 in the object decoder 1204, are corrected by the corrector 1215, and are then input to the image synthesizer 1217. The corrector 1215 corrects an input pixel value p using correction formulas $f2(x)$ to obtain a corrected pixel value P:

$$P=f2(p) \qquad (25)$$

and outputs it.

The image synthesizer 1217 synthesizes images by outputting pixel values from the corrector 1214 when the mask information indicates the object image data from the object decoder 1203; pixel values from the corrector 1215 when the mask information indicates the object image data from the object decoder 1204; and otherwise, pixel values from the corrector 1216, and outputs the synthesized image data to the encoder 113 via the terminal 1218. FIG. 17 shows the synthesized result of images of a background 1160 and person 1061 obtained by correcting those of the background 1050 and the person 1051, an image of a person 1062 obtained by correcting that of the person 1052, and an image of a person 1063 obtained by correcting that of the person 1053. The encoder 113 encodes the output image data by MPEG-1, and outputs the encoded data onto the communication network 115 via the transmitter 114.

In the above operations, the correction formula calculation algorithm of the correction value calculator 1213 operates according to the following rules.

A maximum value Max1, minimum value Min1, average value E1, and variance R1 in the contrast correction image information 1222 from the decoder 1203 are calculated.

Also, a maximum value Max2, minimum value Min2, average value E2, and variance R2 in the contrast correction image information 1223 from the decoder 1204 are calculated.

Furthermore, a maximum value Max3, minimum value Min3, average value E3, and variance R3 in the contrast correction image information 1224 from the decoder 1205 are calculated.

When at most one of the contrast correction image information signals 1222, 1223, and 1224 has a maximum value=255 and a minimum value=0, f1(x), f2(x), and f3(x) are respectively defined by:

$$f1(x)=[\{\alpha(Max-Max1)+Max1\}-\{\beta(Min-Min1)+Min1\}]/(Max1-Min1)\times(x-Min1)+\{\alpha(Max-Max1)+Max1\} \quad (26)$$

$$f2(x)=[\{\alpha(Max-Max2)+Max2\}-\{\beta(Min-Min2)+Min2\}]/(Max2-Min2)\times(x-Min2)+\{\alpha(Max-Max2)+Max2\} \quad (27)$$

$$f3(x)=[\{\alpha(Max-Max3)+Max3\}-\{\beta(Min-Min3)+Min3\}]/(Max3-Min3)\times(x-Min3)+\{\alpha(Max-Max3)+Max3\} \quad (28)$$

where Max and Min are the maximum and minimum values, and α and β are weighting variables or coefficients.

Otherwise, when two of the contrast correction image information signals 1222, 1223, and 1224 have a maximum value=255 and minimum value=0, e.g., assuming that the contrast correction image information 1222 has a maximum value≠255 or a minimum value≠0, f1(x), f2(x), and f3(x) are defined by:

$$f1(x)=[\{\alpha(255-Max1)+Max1\}+\{\beta(0-Min1)+Min1\}]/(Max1-Min1)\times(x-Min1)+\{\alpha(255-Max1)+Max1\} \quad (29)$$

The functions f2(x) and f3(x) are defined to decrease the difference |R2−R3| between their variances. For example, the following third-order spline having three nodes may be used.

For example, when R2>R3, f2(x) and f3(x) are given by:

$$f2(x)=x \quad (30)$$

$$f3(x)=f31(x), x \leq E3\ f32(x), x>E3 \quad (31)$$

Assume that f31(0)=0; f31(E3)=E3; f32(255)=255; f32 (E3)=E3; f(2)31(E3)=f(2)32 (E3); f(1)31(E3)=φ; and f(1)32 (E3)=ψ are satisfied.

Also, α, β, φ, and ψ are weighting variables or coefficients.

Or else, functions f1(x), f2(x), and f3(x) are defined to reduce the differences |R1−R2|, |R1−R3|, and |R2−R3| between their variances.

For example, the following third order spline having three nodes may be used.

For example, when R1>R2>R3, f1(x), f2(x), and f3(x) are respectively defined by:

$$f1(x)=x \quad (32)$$

$$f2(x)=f21(x), x \leq E2\ f22(x), x>E2 \quad (33)$$

$$f3(x)=f31(x), x \leq E3\ f32(x), x>E3 \quad (34)$$

Assume that f21(0)=0; f21(E2)=E2; f22(255)=255; f22 (E2)=E2; f(2)21(E2)=f(2)22(E2); f(1)21(E2)=φ2; and f(1)22 (E2)=ψ2, and f31(0)=0; f31(E3)=E3; f32(255)=255; f32 (E3)=E3; f(2)31)(E3)=f(2)32(E3); f(1)31(E3)=φ3; and f(1) 32(E3)=ψ3 are satisfied.

Also, φ2, φ3, ψ2, and ψ3 are weighting variables or coefficients.

As described above, according to the fifth embodiment, an image including a background image and an object image, is separated into the background image and the object image, upon synthesizing encoded data of these images, feature amounts of these image data are extracted, and the pixel values of the object image to be synthesized are corrected, thus achieving image synthesis immune to incongruity. Also, high-speed processing can be attained since DC components in units of blocks are used in correction value calculations.

In the fifth embodiment, MPEG-4 is used for encoding the object image, and MPEG-1 is used for encoding other images. However, the present invention is not limited to such specific schemes, and any other encoding schemes may be used as long as they have the same functions as those of these schemes.

Furthermore, the memory configuration is not limited to the above-mentioned one. For example, processing may be done using line memories and the like, or other configurations may be adopted.

Some or all of building elements may be implemented by software running on, e.g., a CPU.

Sixth Embodiment

In the sixth embodiment, the object decoders 1203 and 1204, decoder 1205, and correction value calculator 1213 in the fifth embodiment are modified. Hence, a description of details common to the third embodiment will be omitted, and only modified portions will be explained.

A moving image transmission system of this embodiment uses the arrangement shown in FIG. 12 as in the third embodiment. The detailed arrangement of the moving image editor 2112 is the same as that shown in FIG. 21 as in the fifth embodiment.

The detailed arrangement of the object decoders 1203 and 1204 of the sixth embodiment will be described below with reference to FIG. 24. Note that the detailed arrangement of the object decoder 1203 will be described using FIG. 24, and a detailed description of the object decoder 1204 having the same arrangement as the decoder 1203 will be omitted.

Figure 24:
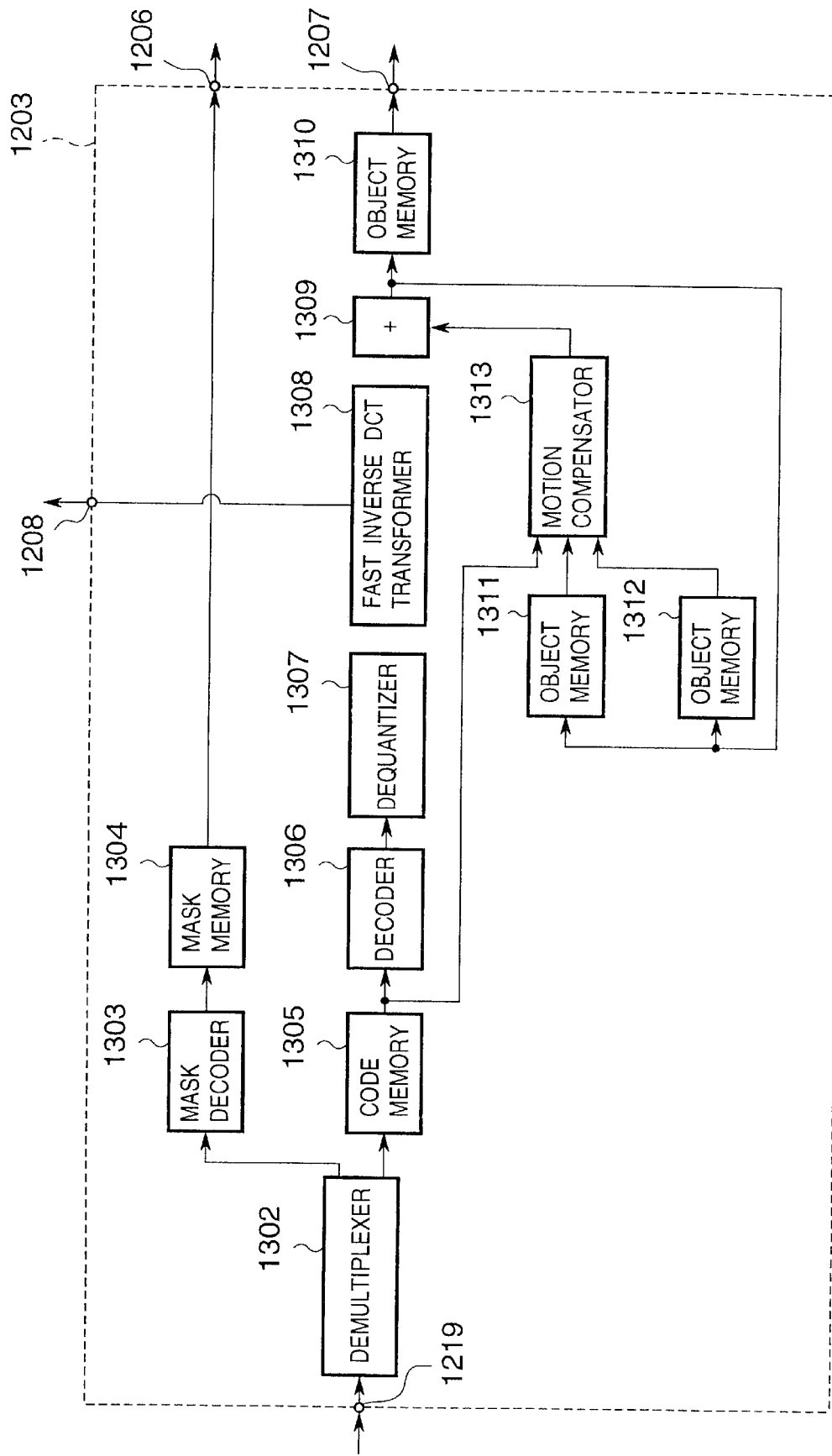
FIG. 24 is a block diagram showing the detailed arrangement of an object decoder in the sixth embodiment of the present invention.

FIG. 24 is a block diagram showing the detailed arrangement of the object decoder according to the sixth embodiment of the present invention.

Reference numeral 1219 denotes a terminal of receiving encoded data from the receiver 110. Reference numeral 1302 denotes a demultiplexer for demultiplexing encoded data of mask information of that of the texture of an object image from the input encoded data. Reference numeral 1303 denotes a mask decoder for decoding the mask information. Reference numeral 1304 denotes a mask memory for storing the mask information. The mask information in the mask memory 1304 is output from the terminal 1206. Reference numeral 1305 denotes a code memory for storing the encoded data of the texture of the object image. Reference numeral 1306 denotes a decoder for decoding the encoded data of the texture of the object image. Reference numeral 1307 denotes a dequantizer. Reference numeral 1308 denotes a fast inverse DCT transformer. Note that the detailed arrangement of the fast inverse DCT transformer 1308 is the same as that shown in FIG. 19. Reference numeral 1309 denotes an adder. Reference numerals 1310, 1311, and 1312 denote object memories for storing image data of the texture of the reconstructed object image. Reference numeral 1313 denotes a motion compensator. Image data in the object memory 1310 is output from the terminal 1207.

In the aforementioned arrangement, the demultiplexer 1302 demultiplexes encoded data of the mask information and that of the texture of the object image from the input encoded data, and inputs these encoded data to the mask decoder 1303 and code memory 1305, respectively. The mask decoder 1303 decodes the encoded data of the mask information to reconstruct mask information, and stores it in the mask memory 1304. The encoded data stored in the code memory 1305 is decoded by the decoder 1306 to reconstruct a quantized value. This value is dequantized by the dequantizer 1307, and is inversely DCT-transformed by radix butterfly operation in the fast inverse DCT transformer 1308. In case of an I-frame macroblock, the motion compensator 1313 is inoperative, and outputs zero. In case of a macroblock to be motion-compensated in P- or B-frame the motion compensator 131 is operative and outputs a motion compensation prediction value. The adder 1309 adds the output from the fast inverse DCT transformer 1308 and the output from the motion compensator 1313, and stores the sum data in the object memory 1310 and the object memory 1311 or 1312. On the other hand, the fast inverse DCT transformer 1308 multiplexes radix butterfly operation results of the n-th stage and outputs the multiplexed result from the terminal 1208 as contrast correction image information.

The detailed arrangement of the decoder 1205 in the sixth embodiment will be described below with reference to FIG. 25.

Figure 25:
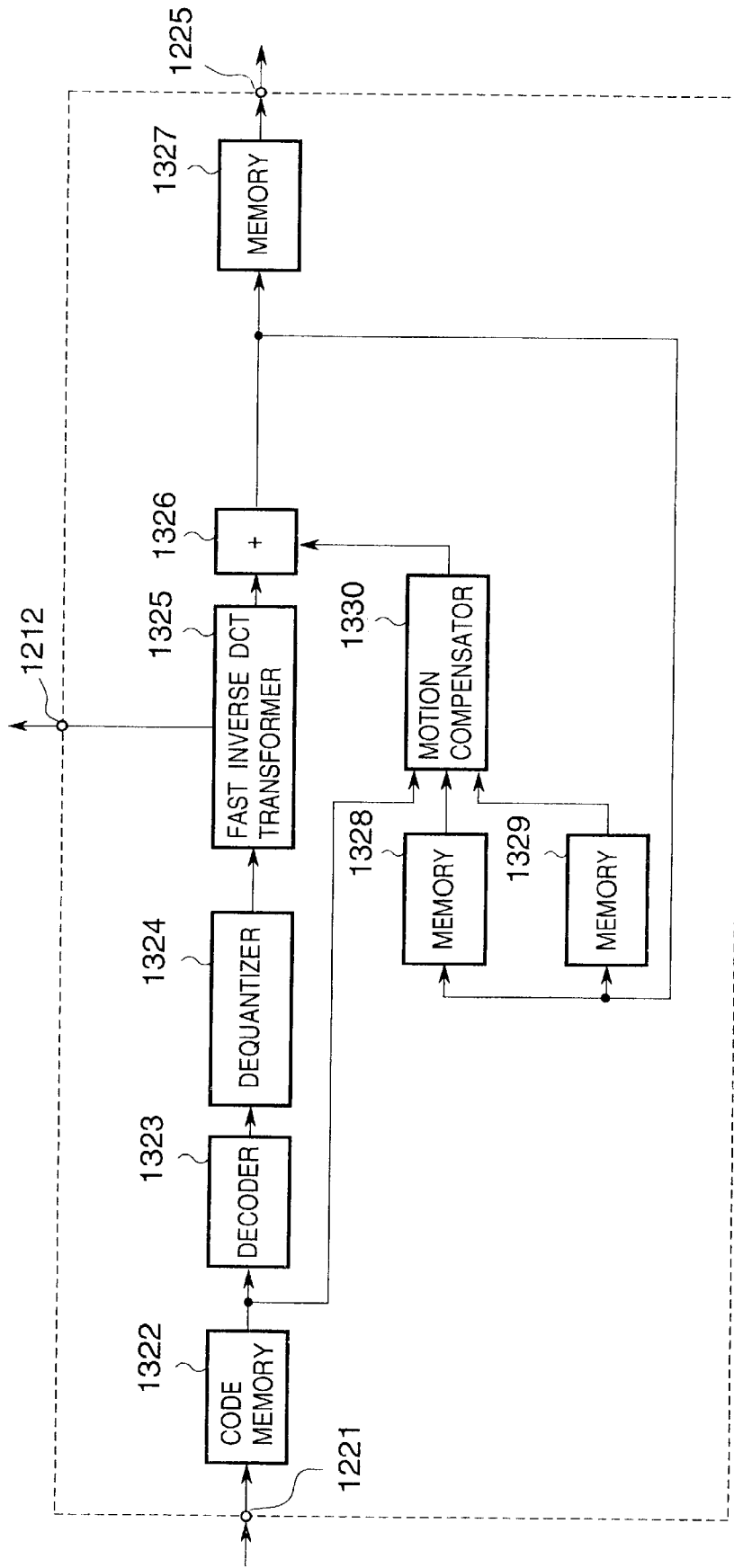
FIG. 25 is a block diagram showing the detailed arrangement of the decoder in the sixth embodiment of the present invention.

FIG. 25 is a block diagram showing the detailed arrangement of the decoder according to the sixth embodiment of the present invention.

Reference numeral 1221 denotes a terminal for receiving encoded data from the storage device 116. Reference numeral 1322 denotes a code memory for storing encoded data. Reference numeral 1323 denotes a decoder for decoding encoded data. Reference numeral 1324 denotes a dequantizer. Reference numeral 1325 denotes a fast inverse DCT transformer. Note that the detailed arrangement of the fast inverse DCT transformer 1325 is the same as that shown in FIG. 19. Reference numeral 1326 denotes an adder. Reference numerals 1327, 1328, and 1329 denote inverse memories for storing decoded image data. Reference numeral 1330 denotes a motion compensator. Image data in the memory 1327 is output from the terminal 1225.

In the above arrangement, the encoded data stored in the code memory 1322 is decoded by the decoder 1323 to reconstruct a quantized value. This value is dequantized by the dequantizer 1324 and is inversely DCT-transformed by the fast inverse DCT transformer 1325. In case of an I-frame macroblock, there motion compensator 1330 is inoperative, and outputs zero. In case of a macroblock to be motion-compensated in P- or B-frame, the motion compensator 1330 is operative and outputs a motion compensation prediction value. The adder 1326 adds the output from the fast inverse DCT transformer 1325 and the output from the motion compensator 1330, and stores the sum data in the memory 1327 and the memory 1328 or 1329. On the other hand, the fast inverse DCT transformer 1325 multiplexes radix butterfly operation results of the n-th stage and outputs the multiplexed result from the terminal 1212 as contrast correction image information.

In the arrangement of the moving image editor 2112 mentioned above, after image data are stored in the object memories 1310 in the object decoders 1203 and 1204, and the memory 1327 in the decoder 1205 upon completion of decoding for one frame, the correction value calculator 1213 obtains the following correction formulas from a correction formula calculation algorithm (to be described later) using the color cast correction image information: correction formulas f1(x), f2(x), and f3(x) respectively for the correctors 1214, 1215, and 1216.

After that, pixel values are read out from the memory 1327 in the decoder 1205 by raster scan in the pixel order of a scan line, are corrected by the corrector 1216, and are then input to the image synthesizer 1217. The corrector 1216 corrects an input pixel value p using correction formulas f3(x) to obtain a corrected pixel value P to obtain a corrected pixel value P expression (23), and outputs it.

On the other hand, when the scan position has reached the synthesis position of object image data in the object decoder 1203, the mask information and image data are read out from the mask memory 1304 and object memory 1310 in the object decoder 1203, are corrected by the corrector 1214, and are then input to the image synthesizer 1217. The corrector 1214 corrects an input pixel value p using correction formulas f1(x) to obtain a corrected pixel value P to obtain a corrected pixel value P expression (24), and outputs it.

When the scan position has reached the synthesis position of object image data in the object decoder 1204, the mask information and image data are read out from the mask memory 1304 and object memory 1310 in the object decoder 1204, are corrected by the corrector 1215, and are then input to the image synthesizer 1217. The corrector 1215 corrects an input pixel value p using correction formulas f2(x) to obtain a corrected pixel value P to obtain a corrected pixel value P by expression (25), and outputs it.

The image synthesizer 1217 synthesizes images by outputting pixel values from the corrector 1214 when the mask information indicates the object image data from the object decoder 1203; pixel values from the corrector 1215 when the mask information indicates the object image data from the object decoder 1204; and otherwise, pixel values from the corrector 1216. The image synthesizer 1217 then outputs the synthesized image data to the encoder 113 via the terminal 1218. The synthesized result of images of a background 1160 and person 1061 obtained by correcting those of the background 1050 and the person 1051, an image of a person 1062 obtained by correcting that of the person 1052, and an image of a person 1063 obtained by correcting that of the person 1053 is substantially the same as that shown in FIG. 17 used in the third embodiment, except for contrast to be exact. The encoder 113 encodes the output image data by MPEG-1, and outputs the encoded data onto the communication network 115 via the transmitter 114.

In the above operations, the correction formula calculations algorithm of the correction value calculator 1213 operates according to the following rules.

A maximum value Max1, minimum value Min1, average value E1, and variance R1 in the contrast correction image information 1222 from the decoder 1203 are calculated.

Also, a maximum value Max2, minimum value Min2, average value E2, and variance R2 in the contrast correction image information 1223 from the decoder 1204 are calculated.

Furthermore, a maximum value Max3, minimum value Min3, average value E3, and variance R3 in the contrast correction image information 1224 from the decoder 1205 are calculated.

When at most one of the contrast correction image information signals 1222, 1223, and 1224 has a maximum value=255 and a minimum value=0, ˆf1(x), ˆf2(x), and ˆf3(x) are respectively defined by:

$$\hat{f1}(x)=[\{\alpha(Max-Max1)+Max1\}-\{\beta(Min-Min1)+Min1\}]/(Max1-Min1)\times(x-Min1)+\{\alpha(Max-Max1)+Max1\} \quad (35)$$

$$\hat{f2}(x)=[\{\alpha(Max-Max2)+Max2\}-\{\beta(Min-Min2)+Min2\}]/(Max2-Min2)\times(x-Min2)+\{\alpha(Max-Max2)+Max2\} \quad (36)$$

$$\hat{f3}(x)=[\{\alpha(Max-Max3)+Max3\}-\{\beta(Min-Min3)+Min3\}]/(Max3-Min3)\times(x-Min3)+\{\alpha(Max-Max3)+Max3\} \quad (37)$$

where Max and Min are the maximum and minimum values, and $\alpha$ and $\beta$ are weighting variables or coefficients.

Otherwise, when two of the contrast correction image information signals 1222, 1223, and 1224 have a maximum value=255 and a minimum value=0, e.g., assuming that the contrast correction image information 1222 has a maximum value≠0 and a minimum value≠255, ^f1(x), ^f2(x), and ^f3(x) are defined by:

$$\hat{f}1(x)=[\{\alpha(255-Max1)+Max1\}-\{\beta(0-Min1)+Min1\}]/(Max1-Min1)\times(x-Min1)+\{\alpha(255-Max1)+Max1\} \quad (38)$$

The functions ^f2(x) and ^f3(x) are defined to decrease the difference |R2−R3| between their variances. For example, the following third-order spline having three nodes may be used.

For example, when R2>R3, ^f2(x) and ^f3(x) are given by:

$$\hat{f}2(x)=x \quad (39)$$

$$\hat{f}3(x)=\hat{f}31(x); x\leq E3 \ \hat{f}32(x); x>E3 \quad (40)$$

Assume that ^f31(0); ^f31(E3)=E3; ^f32(255)=255; ^f32(E3)=E3; ^f$^{(2)}$31(E3)=^f$^{(2)}$32(E3); ^f$^{(1)}$31(E3)=ϕ; and ^f$^{(1)}$32(E3)=ψ are satisfied.

Also, α, β, ϕ, and ψ are weighting variables or coefficients.

Or else, the functions ^f1(x), ^f2(x), and ^f3(x) are defined to reduce the differences |R1−R2|, |R1−R3|, and |R2−R3| between their variances.

For example, the following third-order spline having three nodes may be used.

For example, when R1>R2>R3, ^f1(x), ^f2(x), and ^f3(x) are respectively defined by:

$$\hat{f}1(x)=x \quad (41)$$

$$\hat{f}2(x)=\hat{f}21(x); x\leq E2 \ \hat{f}22(x); x>E2 \quad (42)$$

$$\hat{f}3(x)=\hat{f}31(x); x\leq E3 \ \hat{f}32(x); x>E3 \quad (43)$$

Assume that ^f21(0)=0; ^f21(E2)=E2; ^f22(255)=255; ^f22(E2)=E2; ^f$^{(2)}$21(E2)=^f$^{(2)}$22(E2); ^f$^{(1)}$21(E2)=ϕ2; and ^f$^{(1)}$22(E2)=ψ2, and ^f31(0)=0; ^f31(E3)=E3; ^f32(255)=255; ^f32(E3)=E3; ^f$^{(2)}$31(E3)=^f$^{(2)}$32(E3); ^f$^{(1)}$31(E3)=ϕ3; and ^f$^{(1)}$32(E3)=ψ3 are satisfied.

Also, ϕ2, ϕ3, ψ2, and ψ3 are weighting variables or coefficients.

Based on correction formulas one frame before, the current correction formulas are defined by:

$$f1(x)=f1(x)+\gamma(\hat{f}1(x)-f1(x)) \quad (44)$$

$$f2(x)=f2(x)+\gamma(\hat{f}2(x)-f2(x)) \quad (45)$$

$$f3(x)=f3(x)+\gamma(\hat{f}3(x)-f3(x)) \quad (46)$$

where γ is a weighting variable for tracking changes in correction formula along an elapse of time.

As described above, according to the sixth embodiment, an image including a background image and an object image, is separated into the background image and the object image, upon synthesizing encoded data of these images, feature amounts of these image data are extracted, and the pixel values of the object image to be synthesized are corrected, thus achieving image synthesis immune to incongruity. Also, in consideration of the balance between the object image size and operation speed, the inverse DCT of DC components, the inverse DCT of 2×2 or 4×4 low-frequency components, or the 8×8 inverse DCT can be selectively used in calculating correction values, thus assuring flexible, accurate processing. Furthermore, since color cast correction is made to slowly track changes along with an elapse of time, image synthesis can be done without the sense of incongruity even for images that change considerably.

In the sixth embodiment, MPEG-4 is used for encoding the object image, and MPEG-1 is used for encoding other images. However, the present invention is not limited to such specific schemes, and any other encoding schemes may be used as long as they have the same functions as those of these schemes.

Furthermore, the memory configuration is not limited to the above-mentioned one. For example, processing may be done using line memories and the like, or other configurations may be adopted.

Some or all of building elements may be implemented by software running on, e.g., a CPU.

Finally, the processing flow of the processing executed in the first to sixth embodiments will be explained below with reference to FIG. 26.

Figure 26:
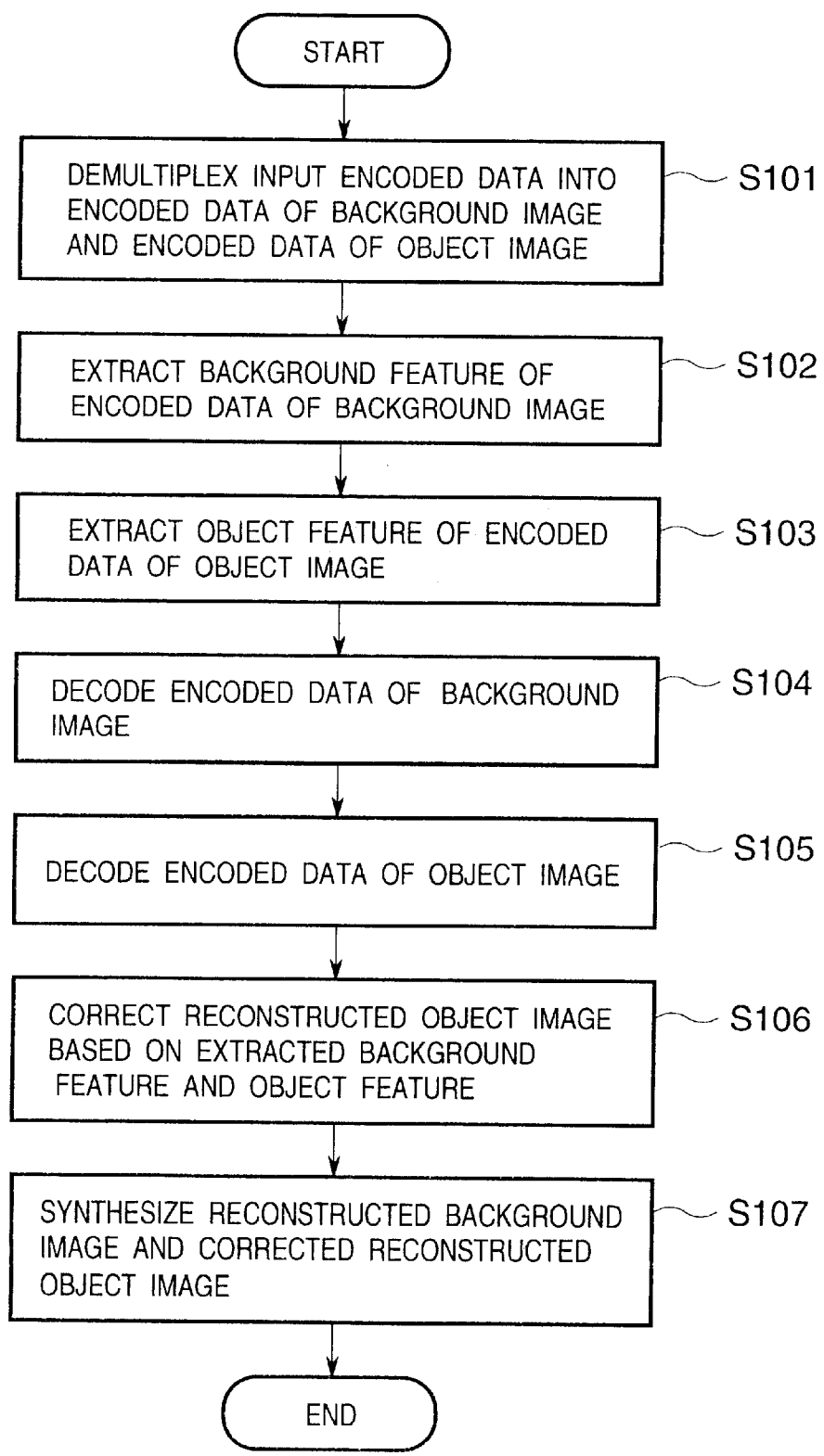
FIG. 26 is a flow chart showing the flow of processing executed in the present invention.

FIG. 26 is a flow chart showing the processing flow of the processing executed in the present invention.

In step S101, input encoded data is demultiplexed into encoded data of a background image, and that of an object image. In step S102, a background feature is extracted from the encoded data of the background image. In step S103, an object feature is extracted from the encoded data of the object image. In step S104, the encoded data of the background image is decoded to generate a reconstructed background image. In step S105, the encoded data of the object image is decoded to generate a reconstructed object image. In step S106, the reconstructed object image is corrected on the basis of the extracted background and object features. The details of this correction have already been described in the individual embodiments. In step S107, the reconstructed background image is synthesized with the corrected reconstructed object image.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In the case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

first feature extraction means for extracting a first feature from first encoded data of a first image;

second feature extraction means for extracting a second feature from second encoded data of a second image;

first decoding means for obtaining a first reconstructed image by decoding the first encoded data;

second decoding means for obtaining a second reconstructed image by decoding the second encoded data;

correction means for correcting one of the first and second reconstructed images based on the first and second features, wherein said correction means performs a correction to reduce a color offset or a contrast difference between the first and second reconstructed images; and synthesis means for synthesizing the first and second reconstructed images.

2. The apparatus according to claim 1, wherein the first image is a background image.

3. The apparatus according to claim 1, wherein the second image is a principal object image.

4. The apparatus according to claim 1, wherein the first and second features are luminance values of images.

5. The apparatus according to claim 1, wherein the first and second features are average values of luminance values of images.

6. The apparatus according to claim 1, wherein the first and second features are maximum values of luminance values of images.

7. The apparatus according to claim 1, wherein the first and second features are chromaticity values of images.

8. The apparatus according to claim 1, wherein the first and second features are maximum luminance values of achromatic color of images.

9. The apparatus according to claim 3, wherein said correction means corrects the principal object image.

10. The apparatus according to claim 1, wherein the first and second encoded data are obtained by encoding image signals in a frequency domain.

11. The apparatus according to claim 1, wherein the first and second features are chromaticity values of images.

12. The apparatus according to claim 1, wherein the first and second encoded data are obtained by moving-image encoding moving image signals in a frequency domain.

13. An image processing method comprising:

a first feature extraction step of extracting a first feature from first encoded data of a first image;

a second feature extraction step of extracting a second feature from second encoded data of a second image;

a first decoding step of obtaining a first reconstructed image by decoding the first encoded data;

a second decoding step of obtaining a second reconstructed image by decoding the second encoded data;

a correction step of correcting one of the first and second reconstructed images based on the first and second features, wherein said correction step includes performing a correction to reduce a color offset or a contrast difference between the first and second reconstructed images; and a synthesis step of synthesizing the first and second reconstructed images.

14. The method according to claim 13, wherein the first image is a background image.

15. The method according to claim 13, wherein the second image is a principal object image.

16. The method according to claim 13, wherein the first and second features are luminance values of images.

17. The method according to claim 13, wherein the first and second features are average values of luminance values of images.

18. The method according to claim 13, wherein the first and second features are maximum values of luminance values of images.

19. The method according to claim 13, wherein the first and second features are chromaticity values of images.

20. The method according to claim 13, wherein the first and second features are maximum luminance values of achromatic color of images.

21. A method according to claim 15, wherein said correction step includes correcting the principal object image.

22. The method according to claim 13, wherein the first and second encoded data are obtained by encoding image signals in a frequency domain.

23. The method according to claim 13, wherein the first and second features are chromaticity values of images.

24. The method according to claim 13, wherein the first and second encoded data are obtained by moving-image encoding moving image signals in a frequency domain.

25. A computer-readable memory storing a program for implementing an image processing method, the program comprising:

program code of a first feature extraction step of extracting a first feature from first encoded data of a first image;

program code of a second feature extraction step of extracting a second feature from second encoded data of a second image;

program code of a first decoding step of obtaining a first reconstructed image by decoding the first encoded data;

program code of a second decoding step of obtaining a second reconstructed image by decoding the second encoded data;

program code of a correction step of correcting one of the first and second reconstructed images based on the first and second features, wherein the correction step includes performing a correction to reduce a color offset or a contrast difference between the first and second reconstructed images; and program code of a synthesis step of synthesizing the first and second reconstructed images.

26. An image processing apparatus for synthesizing a plurality of images, comprising:

background feature extraction means for extracting a background feature from encoded data of at least one background image;

object feature extraction means for extracting an object feature including statistic information of image information from encoded data of at least one object image;

background decoding means for generating a reconstructed background image by decoding the encoded data of the background image;

object decoding means for generating a reconstructed object image by decoding the encoded data of the object image;

correction means for correcting the reconstructed object image based on the background and object features; and synthesis means for synthesizing the reconstructed background image and the reconstructed object image corrected by said correction means, wherein said correction means performs a correction to reduce a color offset or a contrast difference between the reconstructed background image and the reconstructed object image.

27. The apparatus according to claim 26, wherein said object feature extraction means comprises calculation means for calculating a histogram based on the statistic information of the image information, and said correction means determines a correction method for the object image based on the histogram.

28. The apparatus according to claim 26, wherein said object feature extraction means extracts DC information of block images included in the encoded data as the statistic information of the image information.

29. The apparatus according to claim 26, wherein said object feature extraction means extracts low-frequency information of block images included in the encoded data as the statistic information of the image information.

30. The apparatus according to claim 29, wherein one or both of said background decoding means and object decoding means comprise:

decoding means for decoding the encoded data to obtain quantized data;

dequantization means for calculating frequency domain data from the quantized data; and fast inverse discrete cosine transform means for calculating space domain data from the frequency domain data, wherein said fast inverse discrete cosine transform means comprises output means for outputting an arbitrary number of stages of radix butterfly operation results, and wherein said object feature extraction means extracts the arbitrary number of stages of radix butterfly operation results as the low-frequency information of the image information.

31. The apparatus according to claim 26, wherein said correction means comprises time-sequence adaptive means for slowly changing an input/output relationship between input and output signals of said correction means time-sequentially.

32. The apparatus according to claim 26, wherein said object feature extraction means extracts maximum and minimum values of pixel values from one of DC information and low-frequency information of block images included in the encoded data as the statistic information of the image data.

33. The apparatus according to claim 26, wherein said object feature extraction means extracts a variance and average value of pixel values from one of DC information and low-frequency information of block images included in the encoded data as the statistic information of the image data.

34. The apparatus according to claim 26, wherein said correction means converts the object image by a linear function.

35. The apparatus according to claim 26, wherein said correction means converts the object image by an interval spline function.

36. The apparatus according to claim 26, wherein said correction means comprises:

detection means for detecting a presence/absence of a significant color offset from the object feature extracted by said object feature extraction means; and color correction means for correcting the color offset based on a detection result of the detection means.

37. The apparatus according to claim 36, wherein the detection means performs a detection based on the statistic information included in the extracted object feature if a condition in which an absolute value of a difference between an average value and a variance is not more than a given threshold value is satisfied between each respective color signal, and further detects the presence/absence of the significant color offset in a specific region of a histogram based on the statistic information when the condition is satisfied.

38. The apparatus according to claim 36, wherein the color correction means linearly corrects color signals to make the color signals have equal maximum values.

39. The apparatus according to claim 36, wherein the color correction means does not correct a blue signal.

40. The apparatus according to claim 26, wherein said correction means comprises:

detection means for detecting a significant contrast difference between the object feature extracted by said object feature extraction means and the background feature extracted by said background feature extraction means; and contrast correction means for correcting a contrast based on a detection result of the detection means.

41. The apparatus according to claim 40, wherein the detection means extracts maximum and minimum pixel values obtained from the object and background features, and the contrast correction means performs a correction to decrease an absolute value of a difference between the maximum pixel values and an absolute value of a difference between the minimum pixel values in the object and background images, which have different maximum or minimum pixel values.

42. The apparatus according to claim 40, wherein the detection means extracts maximum and minimum pixel values obtained from the object and background features, and the contrast correction means performs a correction to decrease an absolute value of a difference between variances in the object and background images, which have substantially equal maximum or minimum pixel values.

43. An image processing method for synthesizing a plurality of images, comprising:

a background feature extraction step of extracting a background feature from encoded data of at least one background image;

an object feature extraction step of extracting an object feature including statistic information of image information from encoded data of at least one object image;

a background decoding step of generating a reconstructed background image by decoding the encoded data of the background image;

an object decoding step of generating a reconstructed object image by decoding the encoded data of the object image;

a correction step of correcting the reconstructed object image based on the background and object features; and a synthesis step of synthesizing the reconstructed background image and the reconstructed object image corrected in said correction step, wherein said correction step includes performing a correction to reduce a color offset or a contrast difference between the reconstructed background image and the reconstructed object image.

44. The method according to claim 43, wherein
the object feature extraction step comprises a calculation step of calculating a histogram based on the statistic information of the image information, and
said correction step includes determining a correction method for the object image based on the histogram.

45. The method according to claim 43, wherein the object feature extraction step includes extracting DC information of block images included in the encoded data as the statistic information of the image information.

46. The method according to claim 43, wherein the object feature extraction step includes extracting low-frequency information of block images included in the encoded data as the statistic information of the image information.

47. The method according to claim 46, wherein one or both of the background decoding step and object decoding step comprise:
   a decoding step of decoding the encoded data to obtain quantized data;
   a dequantization step of calculating frequency domain data from the quantized data; and
   a fast inverse discrete cosine transform step of calculating space domain data from the frequency domain data,
   wherein the fast inverse discrete cosine transform step comprises an output step of outputting an arbitrary number of stages of radix butterfly operation results, and
   said object feature extraction step includes extracting the arbitrary number of stages of radix butterfly operation results as the low-frequency information of the image information.

48. The method according to claim 43, wherein said correction step comprises a time-sequence adaptive step of slowly changing an input/output relationship between input and output signals in said correction step time-sequentially.

49. The method according to claim 43, wherein said object feature extraction step includes extracting maximum and minimum values of pixel values from one of DC information and low-frequency information of block images included in the encoded data as the statistic information of the image data.

50. The method according to claim 43, wherein said object feature extraction step includes extracting a variance and average value of pixel values from one of DC information and low-frequency information of block images included in the encoded data as the statistic information of the image data.

51. The method according to claim 43, wherein said correction step includes converting the object image by a linear function.

52. The method according to claim 43, wherein said correction step includes converting the object image by an interval spline function.

53. The method according to claim 43, wherein said correction step comprises:
   a detection step of detecting a presence/absence of a significant color offset from the object feature extracted in said object feature extraction step; and
   a color correction step of correcting the color offset based on a detection result in the detection step.

54. The method according to claim 53, wherein the detection step includes detecting, based on the statistic information included in the extracted object feature if a condition in which an absolute value of a difference between an average value and a variance is not more than a given threshold value is satisfied between respective color signals, and further includes detecting the presence/absence of the significant color offset in a specific region of a histogram based on the statistic information when the condition is satisfied.

55. The method according to claim 53, wherein the color correction step includes linearly correcting color signals to make the color signals have equal maximum values.

56. The method according to claim 53, wherein a blue signal is not corrected in the color correction step.

57. The method according to claim 53, wherein said correction step comprises:
   a detection step of detecting a significant contrast difference between the object feature extracted in said object feature extraction step and the background feature extracted in said background feature extraction step; and
   a contrast correction step of correcting a contrast based on a detection result in the detection step.

58. The method according to claim 57, wherein
the detection step includes extracting maximum and minimum pixel values obtained from the object and background features, and
the contrast correction step includes performing a correction to decrease an absolute value of a difference between the maximum pixel values and an absolute value of a difference between the minimum pixel values in the object and background images, which have different maximum or minimum pixel values.

59. The method according to claim 57, wherein
the detection step includes extracting maximum and minimum pixel values obtained from the object and background features, and
the contrast correction step includes performing a correction to decrease an absolute value of a difference between variances in the object and background images, which have substantially equal maximum or minimum pixel values.

60. A computer-readable memory storing a program for implementing an image processing method for synthesizing a plurality of images, the program comprising:
   program code of a background feature extraction step of extracting a background feature from encoded data of at least one background image;
   program code of an object feature extraction step of extracting an object feature including statistic information of image information from encoded data of at least one object image;
   program code of a background decoding step of generating a reconstructed background image by decoding the encoded data of the background image;
   program code of an object decoding step of generating a reconstructed object image by decoding the encoded data of the object image;
   program code of a correction step of correcting the reconstructed object image based on the background and object features; and
   program code of a synthesis step of synthesizing the reconstructed background image and the reconstructed object image corrected in the correction step,
   wherein the correction means includes performing a correction to reduce a color offset or a contrast difference between the reconstructed background image and the reconstructed object image.

* * * * *

UNITED STATES PATENT AND TRADEMARK OFFICE
CERTIFICATE OF CORRECTION

PATENT NO.     : 6,546,052 B1                                              Page 1 of 1
DATED          : April 8, 2003
INVENTOR(S)    : Mitsuru Maeda et al.

It is certified that error appears in the above-identified patent and that said Letters Patent is hereby corrected as shown below:

Drawings,
Sheet 9, Fig. 10, "STRAGE" should read -- STORAGE --.

Column 10,
Line 26, "and the object memory" should read -- , --.
Line 27, ", and 162" should be deleted.

Column 16,
Line 35, "numerals" should read -- numeral --.

Column 35,
Line 19, "^f31(0);" should read -- ^f31(0)=0; --.

Column 38,
Line 20, "A" should read -- The --.

Signed and Sealed this

Sixteenth Day of December, 2003

JAMES E. ROGAN
*Director of the United States Patent and Trademark Office*